(12) United States Patent
Yoneya et al.

(10) Patent No.: US 6,242,060 B1
(45) Date of Patent: Jun. 5, 2001

(54) ACTIVE-MATRIX LIQUID CRYSTAL DISPLAY

(75) Inventors: Makoto Yoneya, Hitachinaka; Kishiro Iwasaki, Hitachiota; Yasushi Tomioka; Hisao Yokokura, both of Hitachi; Katsumi Kondo, Hitachinaka; Yoshiharu Nagae, Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/281,810

(22) Filed: Mar. 31, 1999

Related U.S. Application Data

(63) Continuation of application No. 08/848,453, filed on May 8, 1997, now Pat. No. 5,928,733.

(30) Foreign Application Priority Data

| May 8, 1996 | (JP) | 8-113748 |
| Jun. 20, 1996 | (JP) | 8-159496 |
| Aug. 22, 1996 | (JP) | 8-221069 |
| Oct. 11, 1996 | (JP) | 8-269632 |

(51) Int. Cl.$^7$ ................................................ G02F 1/1337
(52) U.S. Cl. ...................... 428/1.23; 428/1.26; 428/1.27
(58) Field of Search ................................. 428/1.23, 1.26, 428/1.27

(56) References Cited

U.S. PATENT DOCUMENTS

| 5,344,916 | 9/1994 | Harris et al. . |
| 5,480,964 | 1/1996 | Harris et al. . |
| 5,856,431 | * 1/1999 | Gibbons et al. ................. 428/1.26 |

OTHER PUBLICATIONS

IEICE Tranactions on Electronics, Vo.. E379–C, No. 8, Aug. 96.
Liquid Crystals, vol. 22, No. 4, pp. 391–400, Dec. 97.
Liquid Crystals, vol. 22, No. 4, pp. 379–390, Apr. 97.

* cited by examiner

*Primary Examiner*—Alexander S. Thomas
(74) *Attorney, Agent, or Firm*—Antonelli, Terry, Stout & Kraus, LLP

(57) ABSTRACT

An active-matrix liquid crystal display device having a pair of substrates at least one of which is transparent, a liquid crystal layer disposed between the pair of substrates, a group of electrodes for applying to the liquid crystal layer an electric field substantially parallel to the substrate plane and a plural number of active elements being formed on one of the pair of substrates, and an alignment layer disposed between the liquid crystal layer and at least one of the pair of substrates. The alignment layer is a photo-reactive material layer, and the photo-reactive material layer is a photo-reactive alignment layer which has been subjected to linearly polarized light irradiation to selectively derive a photochemical reaction.

8 Claims, 9 Drawing Sheets

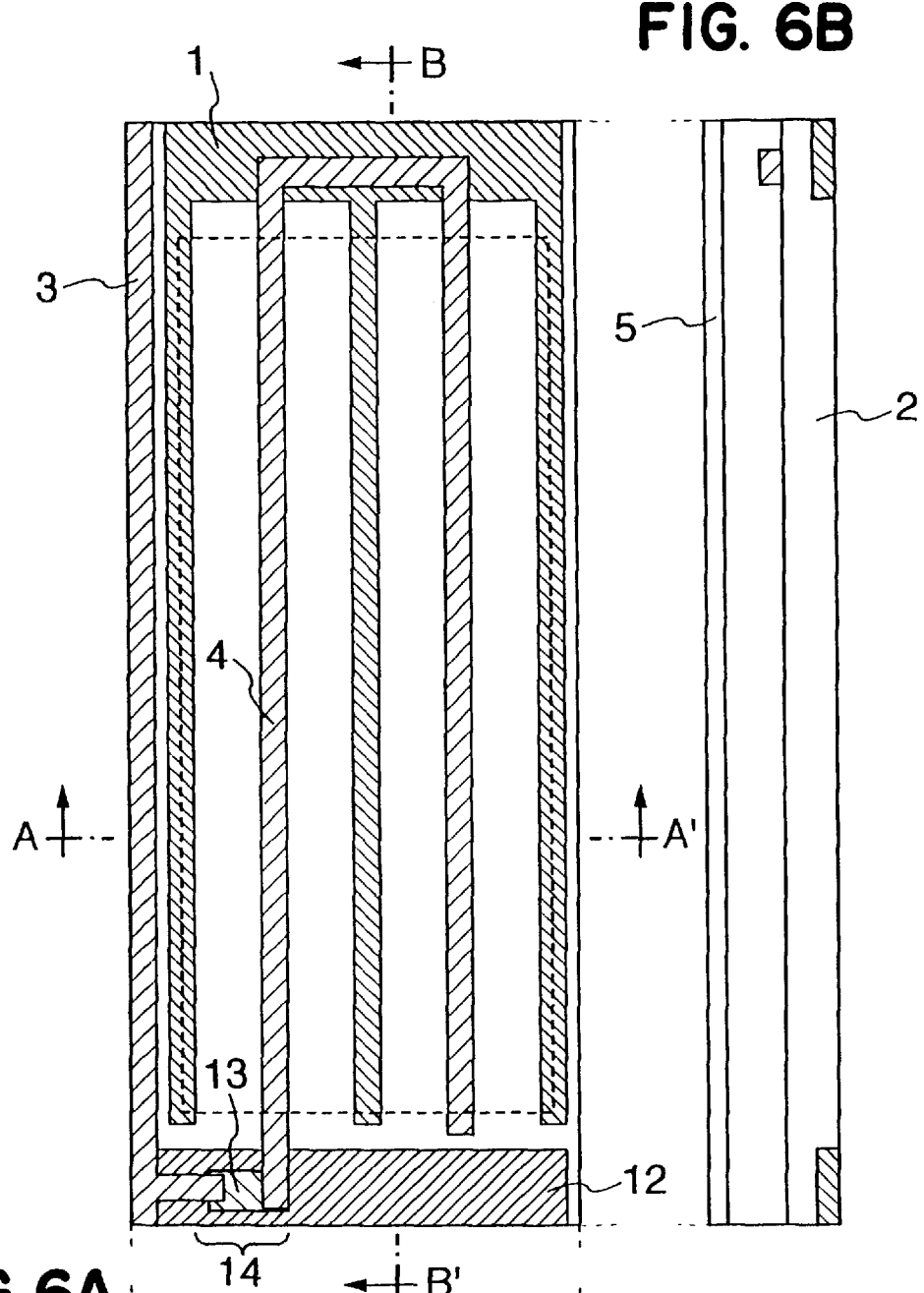
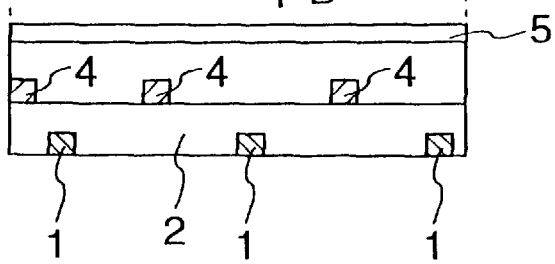

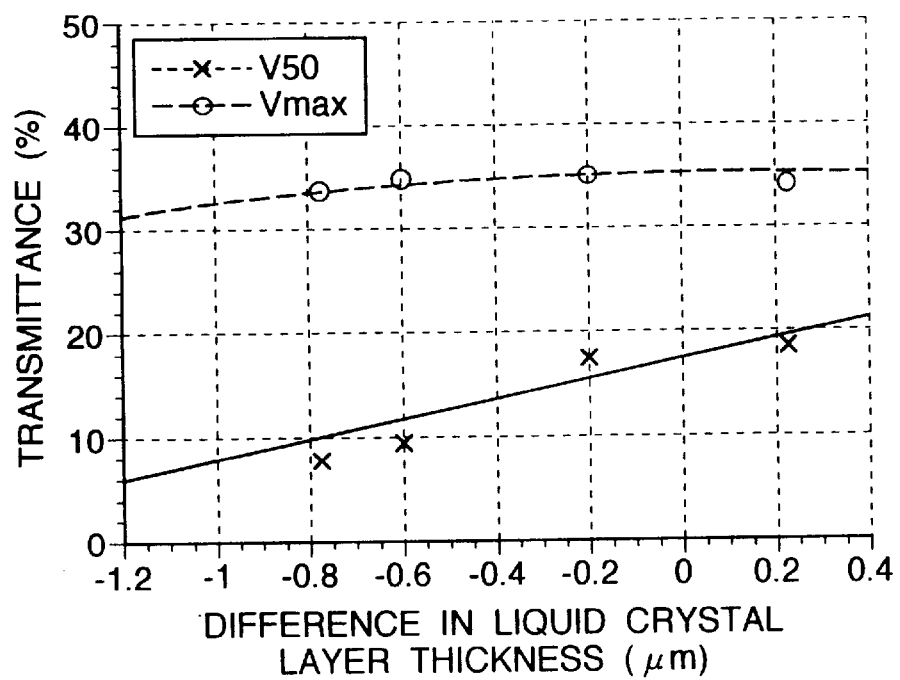
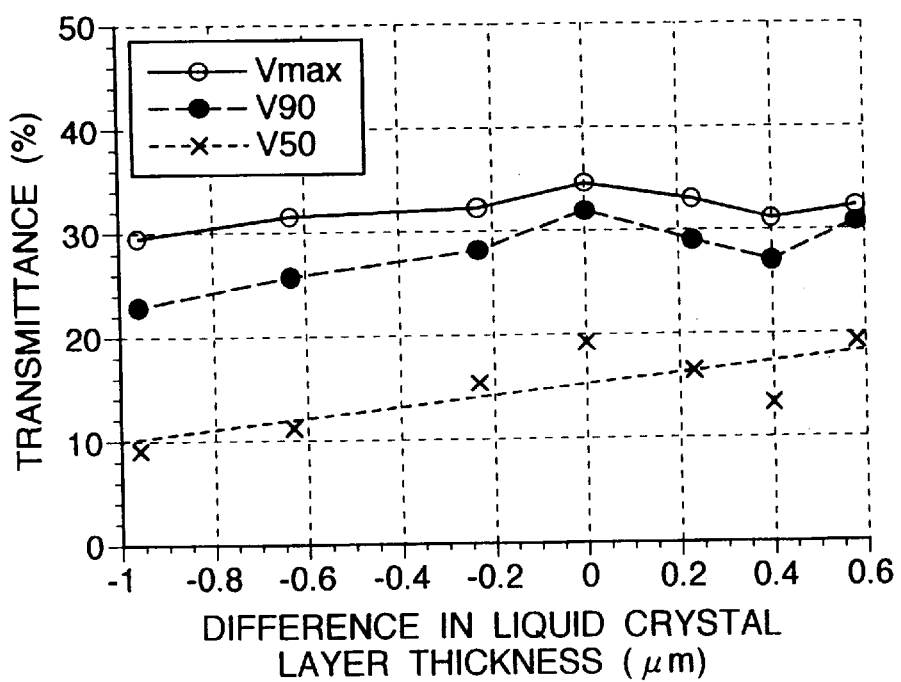

ACTIVE-MATRIX LIQUID CRYSTAL DISPLAY

CROSS REFERENCE TO RELATED APPLICATION

This is a continuation of U.S. application Ser. No. 08/848,453, filed May 8, 1997, now U.S. Pat. No. 5,928,733 the subject matter of which is incorporated by reference herein.

BACKGROUND OF THE INVENTION

The present invention relates to an active-matrix liquid crystal display device.

In liquid crystal display devices, displaying is performed by varying the optical properties of the liquid crystal layer disposed between the substrates by changing the alignment direction of the liquid crystal molecules in the layer by applying an electric field thereto.

The conventional active-matrix liquid crystal displays have predominantly been of the twisted nematic (TN) mode in which the direction of the electric field applied to the liquid crystal molecules is set to be substantially vertical to the substrate plane, and display is performed by making use of optical rotatory power of the liquid crystals.

On the other hand, a system which makes use of the birefringence effect of the liquid crystals by setting the direction of the electric field applied to the liquid crystals to be substantially parallel to the substrate plane by using interdigital electrodes (in-plane switching mode) has been proposed in, for instance, JP-B 63-21907 and WO 91/10936 (JP-T 5-505247). This in-plane switching mode has the advantages of wide viewing angle and low load capacity in comparison with the conventional TN mode, and is a promising technique for the development of active-matrix liquid crystal displays.

In this in-plane switching mode, however, since it utilizes the birefringence effect of the liquid crystals for making display, it is necessary to set the gap between the substrates (liquid crystal layer thickness) to be about 4 μm, which is notably smaller than that of the TN mode (about 10 μm), for obtaining a display performance equal to the TN mode. Generally, reduction of the layer thickness brings into relief the influence of display irregularity due to nonuniformity of the gap between the substrates, giving rise to such problems as deterioration of displayed image quality and reduction of yield resulting in lowered mass productivity.

The gap between the substrates is controlled to a specified value by dispersing the uniformly sized spherical polymer beads as spacer of the opposing substrates between which the liquid crystal layer is disposed.

In the active-matrix liquid crystal display devices, a level difference of up to about 1 μm may be produced on the substrate surface at the active element forming section, and a certain degree of nonuniformity of the inter-substrate gap is inevitably produced at the pixel region, too, due to a delicate relation between said level difference and dispersion of said spacer beads.

In the in-plane switching mode, the same degree of gap irregularity represents a far greater rate of gap variation than in the TN mode because of smaller inter-substrate gap, so that the techniques for lessening or eliminating display irregularity due to non-uniformity of said gap are of vital importance for the in-plane switching mode.

Further, according to the known TN mode, there is no dependence of the threshold voltage on the gap between the substrates (due to voltage responsivity), while according to the in-plane switching mode, since the gap between the substrates independently contributes to the threshold voltage (due to field responsivity) together with the gap between electrodes (Oh-e, et al. Appl. Phys. Lett. 67 (26), 1996, pp 3895–3897), particularly severe control of the gap between the substrates is necessary.

SUMMARY OF THE INVENTION

The present invention is envisaged to solve the above problems, and for this purpose, it provides an active-matrix liquid crystal display device employing the in-plane switching mode, which is minimized in or almost free of nonuniformity or irregularity of display resulting from variation of the gap between the substrates, and which is also capable of displaying high-quality images and has excellent mass productivity.

The active-matrix liquid crystal display device according to the present invention comprises a group of electrodes for applying an electric field to the liquid crystal layer disposed between a pair of substrates, said electric field being parallel to the plane of said substrates, active elements provided in connection to said electrodes, and an alignment layer(s) which aligns the liquid crystal molecules in the substantially same direction at the interface between said liquid crystal layer and at least one of the opposing substrates, wherein the extrapolation length, which expresses the strength of tortional anchoring of the liquid crystal molecules and said alignment layer surface at one or both of the interfaces between said liquid crystal layer and said opposing substrates, is set to be not less than 10% of the gap between the substrates (liquid crystal layer thickness).

The "extrapolation length" refers to the increment of the apparent inter-substrate gap when the liquid crystal cell behaves like a cell having a greater inter-substrate gap than the actual gap in terms of the threshold characteristics on application of an electric field, in case the interfacial anchoring is weak and finite (de Gennes: The Physics of Liquid Crystal, Oxford University Press, 1974, page 75).

The alignment layer used in the present invention may be one in which the tortional anchoring coefficient A2 at the alignment layer surface against the liquid crystal molecules at the interface is less than 20 μN/m.

Regarding the method for changing the optical properties according to the status of molecular alignment of said liquid crystal layer, it is expedient to use a pair of polarizers arranged to have their axes of polarization crossed at right angles with each other, and to select the parameter d·Δn (d: liquid crystal layer thickness; Δn: refractive index anisotropy of the liquid crystal composition) so as to satisfy the relation of 0.2 μm<d·Δn<0.5 μm.

It is desirable that the controlled alignment direction of the liquid crystal molecules is substantially the same at the two interfaces between said liquid crystal layer and said pair of substrates.

Also, at least one of the alignment layers formed on said substrates is preferably made of an organic polymer containing a polymer and/or oligomer in which the polymerizate of long-chain alkylene groups and/or fluoro groups provided in the amine or acid moiety accounts for 5–30% of the total number of moles.

The polymer and/or oligomer used in said alignment layer are preferably those having a weight-average molecular weight of 2,000–90,000. The long-chain alkylene groups and/or fluoro groups in the polymer may be main chain type, side chain type or terminal type.

The alignment layer is preferably made of an organic polymer having long-chain alkylene groups and/or fluoro groups, which includes a polymer and/or oligomer-amic acid imide type, polymer and/or oligomer-imide type, polymer and/or oligomer-imidosiloxane type, and polymer and/or oligomer-amide-imide type. It is also possible to use an organic polymer obtained from dehydration ring-closing reaction of a polymer and/or oligomer-amic acid comprising a single-ring rigid diamine as amine moiety and an aliphatic tetracarboxylic acid dianhydride and/or an alicyclic tetracarboxylic acid dianhydride and an aromatic tetracarboxylic acid dianhydride having main chain type long-chain alkylene groups and/or fluoro groups as acid moiety.

According to an embodiment of active-matrix liquid crystal display device of the present invention, at least one of the alignment layers formed on the substrates may be an inorganic material layer. This inorganic material layer is preferably an inorganic alignment layer which has been surface treated by oblique evaporation technique. In case of using such an inorganic alignment layer, an organic alignment layer may be used as the other alignment layer. Such an organic alignment layer is preferably a layer of an organic polymer which has had a rubbing treatment.

According to an embodiment of the electrodes and active elements used in the present invention, it is desirable that these are formed only on one of the pairing substrates, and that the outermost surface of this substrate is constituted by an inorganic material layer.

According to another embodiment of active-matrix liquid crystal display device of the present invention, at least one of the alignment layers formed on the respective substrates may be a layer of a photoreactive material. Such a photoreactive material layer is preferably a photoreactive alignment layer which has been subjected to linearly polarized light irradiation treatment, and such a photoreactive alignment layer is preferably made of an organic polymer containing a polymer and/or oligomer having at least one diazobenzene group.

BRIEF DESCRIPTION OF THE DRAWINGS

These and other objects, features and advantages of the present invention will be understood more clearly from reviewing the following detailed description with reference to the accompanying drawings, wherein:

FIGS. 1A and 1C show the states of the liquid crystal molecules in a situation where no electric field has been applied, and FIGS. 1B and 1D show the states of the liquid crystal molecules in a situation where an electric field has been applied.

FIG. 4A shows the characteristics observed when torsional anchoring is strong, and FIG. 4B shows the characteristics seen when torsional anchoring is weak.

FIG. 6 is a structural illustration of thin-film transistors, electrodes and wiring in the device of the present invention.

FIG. 6a is a frontal view, and FIGS. 6b and 6c are the side sectional views.

FIG. 9 is a graph showing the results of determinations in still another example of the present invention.

FIG. 10 is a graph showing the results of determinations in yet another example of the present invention.

DESCRIPTION OF THE PREFERRED EMBODIMENTS

Firstly, in the in-plane switching mode embodying the present invention, the torsional anchoring between the liquid crystal molecules and the alignment layer surface at their interface is set to such a low level that the extrapolation length, which is an index of torsional anchoring strength, will become 10% or more than 10% of the gap between the substrates.

Figure 1A:
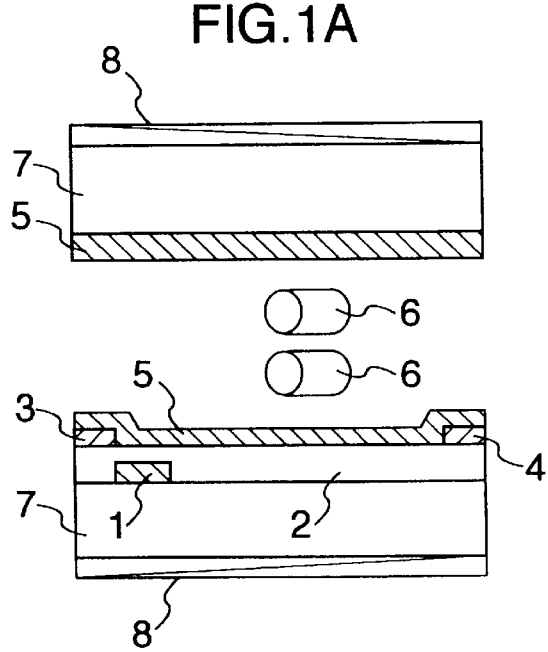
FIGS. 1A, 1B, 1C and 1D are the schematic illustrations of behavior of the liquid crystal molecules in the liquid crystal display device according to the present invention.
Figure 1B:
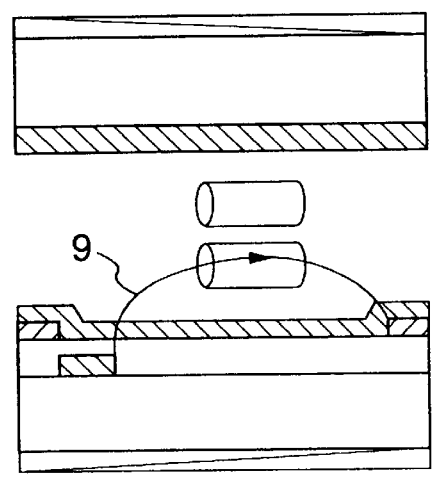

The working principles of the in-plane switching mode which underlie the present invention are explained with reference to a model case shown in FIG. 1. FIGS. 1A and 1B are the sectional illustrations of behavior of the liquid crystal molecules in a liquid crystal element of the in-plane switching mode, and FIGS. 1C and 1D are the frontal views thereof (a portion corresponding to only one of the pixels is shown here).

Figure 1C:
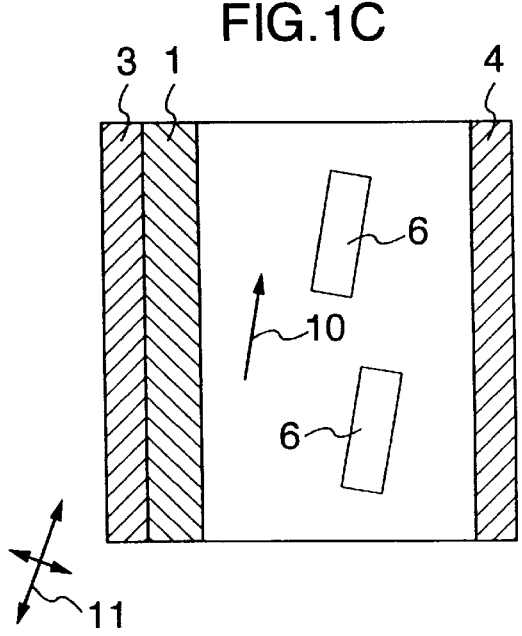

A section on the cell side with no voltage applied is shown in FIG. 1A, and a frontal view thereof is shown in FIG. 1C. Linear electrodes 4, 1 are formed on the inside of one of the substrates. The surfaces of both of the pairing substrates are constituted by an alignment layer, and a liquid crystal composition is sandwiched between the substrates. (In this instance, dielectric anisotropy of the composition is supposed to be positive, but the in-plane switching mode can be similarly realized with a negative liquid crystal composition by simply interchanging the direction of the major axis and the minor axis of the liquid crystal molecules.)

The rod-like liquid crystal molecules 6 are aligned in the direction indicated by 10, which has a slight angular difference from the longitudinal direction (in the frontal view of FIG. 1C) of the electrodes 4, 1, at the interface of the two substrates by anchoring with the alignment layers 5. They stay in this state almost uniformly in the liquid crystal layer when no voltage is applied.

Figure 1D:
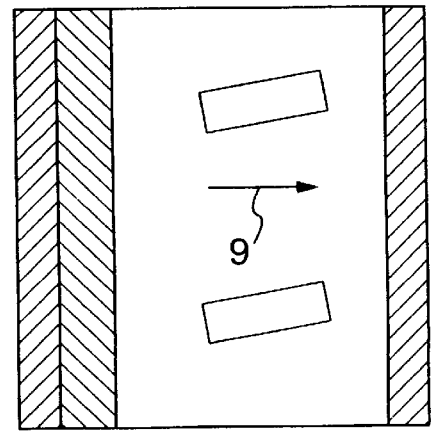

Here, when different potentials are given to the pixel electrode 4 and the common electrode 1 to generate an electric field 9 in the liquid crystal composition layer by the potential difference between the two electrodes, the liquid crystal molecules are turned to the direction of electric field as shown in FIGS. 1B and 1D by the interaction of the dielectric anisotropy of the liquid crystal composition and the electric field. This motivates a change of the optical properties of the liquid crystal element by the action of the refractive index anisotropy of the liquid crystal composition layer and the polarizer 8, and such a change prompts display.

Here, the relation between in-plane switching mode and interfacial torsional anchoring is discussed while making comparison with the conventional TN mode.

It is known that the alignment regulating force (anchoring force) by anchoring of the alignment layer and liquid crystal molecules varies significantly depending on the material of the alignment layer and the rubbing conditions, but it also varies according to the direction in which the alignment of the liquid crystal molecules is changed on the alignment layer surface.

Figure 2:
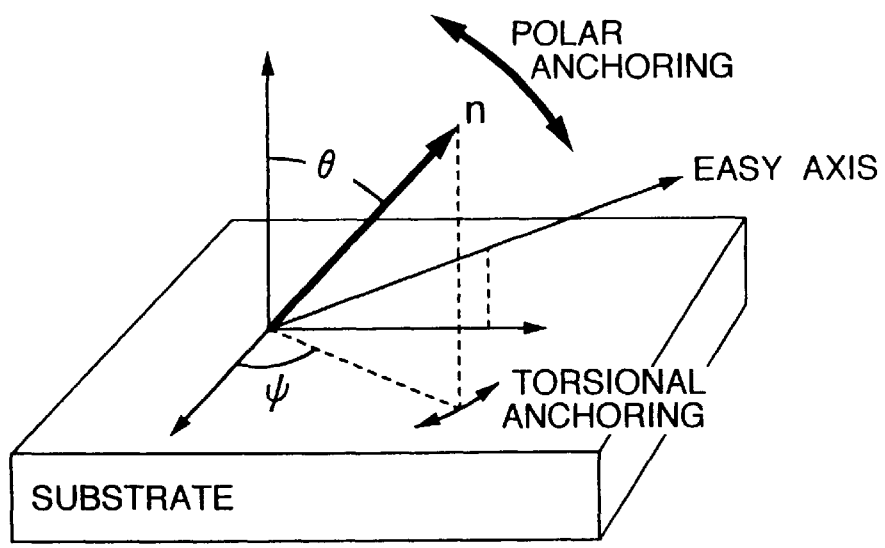
FIG. 2 illustrates polar anchoring and torsional anchoring of the liquid crystal molecules on the substrate surface.

In the case of a liquid crystal material having a positive dielectric anisotropy aligned substantially horizontally on the surface, the change of alignment of the liquid crystal molecules on the substrate surface induced by the application of an electric field is made in the direction rising up from the surface in the TN mode in which the electric field is applied substantially vertically to the substrate interface, while such change of alignment is made in the in-plane direction of the surface in the in-plane switching mode in which the electric field is applied substantially parallel to the substrate interface. Thus, the alignment regulating force at the interface is based on the polar anchoring illustrated in FIG. 2 in the conventional TN mode, while it is based on the torsional anchoring, also illustrated in FIG. 2, in the in-plane switching mode. Generally, polar anchoring is very strong almost unexceptionally (Proust, et al: Colloid & Polymer Sci., 254, 672–673, 1976), while torsional anchoring is relatively weak, and it is practically possible to find out an alignment film which shows weak torsional anchoring as proposed in the present invention (Levy, et al: Journal de Physique Letters, Vol. 40, 1979, L-215).

By weakly setting the torsional anchoring at the liquid crystal/alignment layer interface so that the extrapolation length will become greater than 10% of the gap between the substrates, it is possible, in the in-plane switching mode, to lessen display irregularity caused by nonuniformity of the gap between the substrates as compared with the case of strong torsional anchoring at said interface, even with a same degree of gap nonuniformity.

The reason why display irregularity can be lessened by weakening said torsional anchoring in the in-plane switching mode is explained below.

Figure 3:
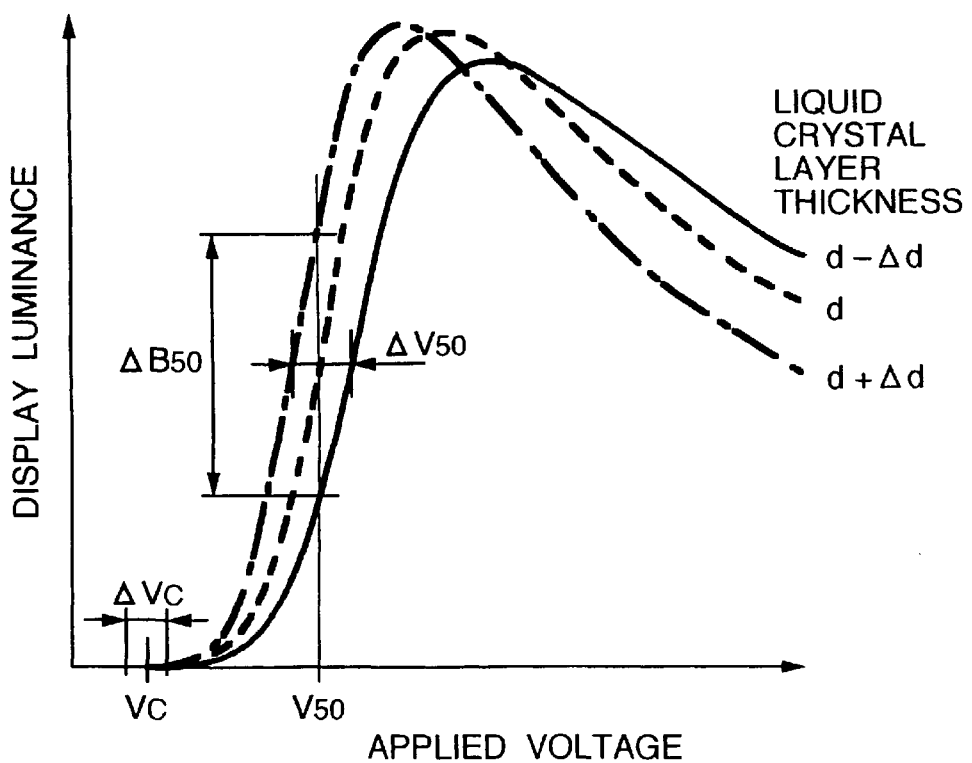
FIG. 3 is a graph showing the electro-optical characteristics of the in-plane switching mode.

FIG. 3 graphically illustrates variation of display luminance with change of the voltage applied across the electrodes in an in-plane switching mode liquid crystal display device. Graphed in FIG. 3 are the three patterns of variation of voltage-luminance characteristics when the inter-substrate gap of a liquid crystal element was changed slightly ($\pm\Delta d$) in correspondence to variation of nonuniformity of the gap.

The threshold voltage Vc of the change of alignment (Fredericksz transition) for the in-plane field of the liquid crystal molecules in the in-plane switching mode with equal torsional anchoring at the interfaces of the liquid crystal layer and the two pairing substrates is approximately given by the following equation (Yokoyama: Mol. Cryst. Liq. Cryst., 1988, Vol. 165, pp. 265–316; Oh-e, et al: Appl. Phys. Lett., Vol. 67, 1995, pp. 3895–3897):

$$Vc=(\pi g/(d+2b))\sqrt{(K2/\Delta\epsilon)} \quad (1)$$

wherein d and g denote the gap between the substrates (liquid crystal layer thickness) and the gap between the electrode ends, respectively, K2 and $\Delta\epsilon$ denote twist elastic constant and dielectric anisotropy, respectively, of the liquid crystal composition, and b denotes the extrapolation length which expresses the torsional anchoring strength of the liquid crystal molecules and the alignment layer surface at the interface defined by the following equation using the torsional anchoring coefficient A2 of the alignment layer surface:

$$b=K2/A2 \quad (2)$$

The stronger the torsional anchoring of the alignment layer surface, the smaller becomes the extrapolation length b; b is supposed to be 0 when the torsional anchoring is so strong that the direction of alignment of the liquid crystal molecules on the alignment layer surface is considered fixed.

The variation of threshold voltage $\Delta Vc$ when the gap between the substrates changed by $\pm\Delta d$ from the center value d is given by the following equation:

$$\Delta Vc=(2\pi g\Delta d/((d+2b)-(\Delta d))\sqrt{(K2/\Delta\epsilon)} \quad (3)$$

Let us here consider the case of gray level display where display irregularity appears most conspicuously. Taking the instance of the applied voltage V50 at which the display luminance shown in FIG. 3 is reduced to half (50%) of the maximum luminance and the amount of variation $\Delta V50$ induced when the gap between the substrates changed by $\pm\Delta d$, it is considered that $\Delta V50$ is almost proportional to the afore-mentioned $\Delta Vc$.

The ratio of "$\Delta V50$weak" (in case torsional anchoring at the interface is weak) to "$\Delta V50$str" (in case torsional anchoring is so strong that the extrapolation length is considered to be 0) is given by the following equation:

$$\Delta V50\text{weak}/\Delta V50\text{str}=(d\cdot d-\Delta d\cdot \Delta d)/((d+2b)\cdot(d+2b)-\Delta d\cdot \Delta d) \quad (4)$$

When nonuniformity of the gap is $\Delta d$ and $\Delta d\cdot\Delta d<d\cdot d$, then the above equation can be approximated by:

$$\Delta V50\text{weak}/\Delta V50\text{str}\approx 1/((1+2b/d)\cdot(1+2b/d)) \quad (5)$$

Figure 4A:
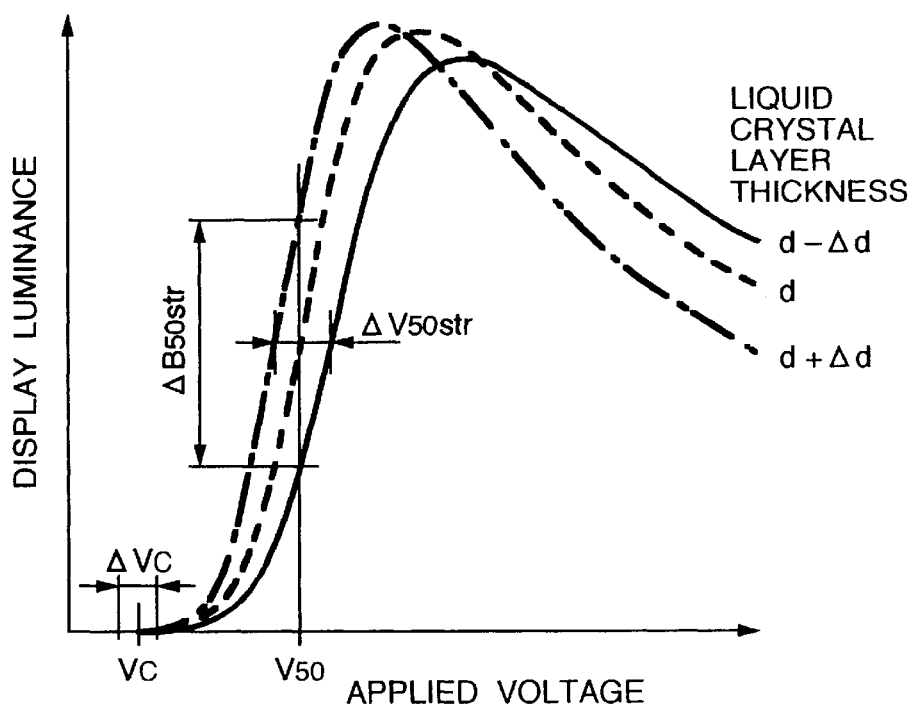
FIGS. 4A and 4B are graphic illustrations of the electro-optical characteristics in the device of the present invention.
Figure 4B:
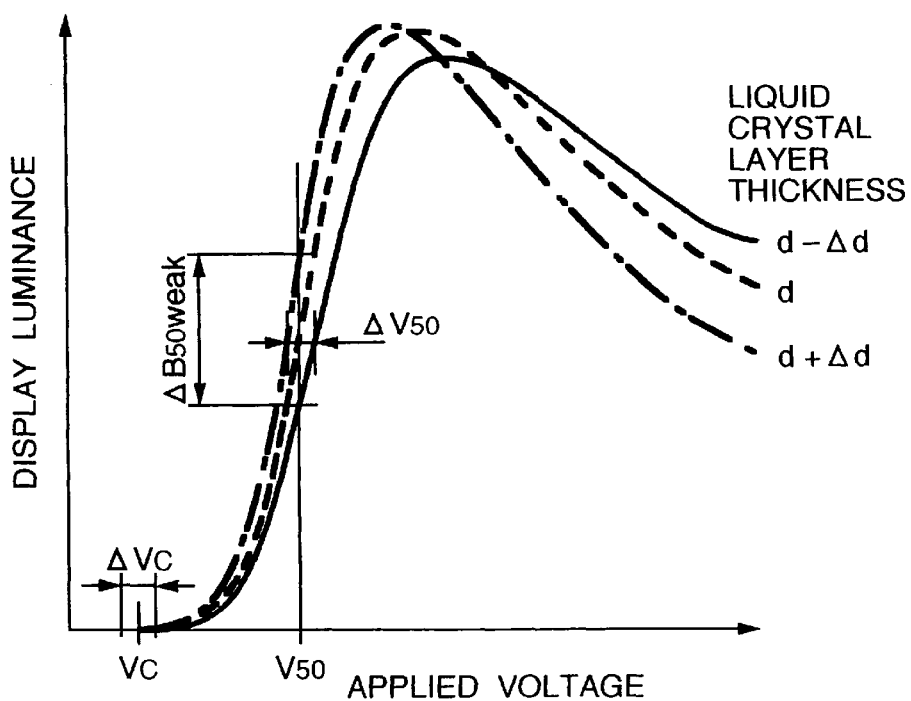

Since b>0, the above formula gives $\Delta V50$weak/$\Delta V50$str<1. It is thus seen that in case the torsional anchoring is weak (FIG. 4B), the range of variation of V50 incidental to the change of the gap is diminished as compared with the case of strong torsional anchoring (FIG. 4A) as shown in FIG. 4.

Regarding the range of variation of luminance $\Delta B50$ corresponding to $\Delta V50$ as shown in FIG. 3, it is considered that $\Delta B50$ is almost proportional to $\Delta V50$. Therefore, in the range of luminance variation of $\Delta B50$ caused by gap change of $\pm\Delta d$, the ratio of luminance variation in the case of weak torsional anchoring at the interface to that in the case of strong torsional anchoring can be approximated by the formula (5), and when the ratio of the extrapolation length to the gap between the substrates is given as $b^*=b/d$, the following approximation is possible:

$$\Delta B50\text{weak}/\Delta B50\text{str}\approx 1/((1+2b^*)\cdot(1+2b^*)) \quad (6)$$

Since $b^*>0$, $\Delta B50$weak/$\Delta B50$str<1. It is thus seen that the variation of luminance resulting from gap unevenness can be minimized by weakening torsional anchoring at the interface as shown in FIG. 4. That is, when torsional anchoring is weakened, the range of variation ($\Delta V50$) of the characteristic curve caused by change of the inter-substrate gap to $d\pm\Delta d$ in FIG. 3 is lessened, causing a corresponding reduction of variation ($\Delta B50$) of display luminance.

The above $\Delta B50$weak/$\Delta B50$str ratio can be considered as an index of reduction of display irregularity (variation of luminance) against variation of gap by the weak torsional anchoring effect.

Figure 5:
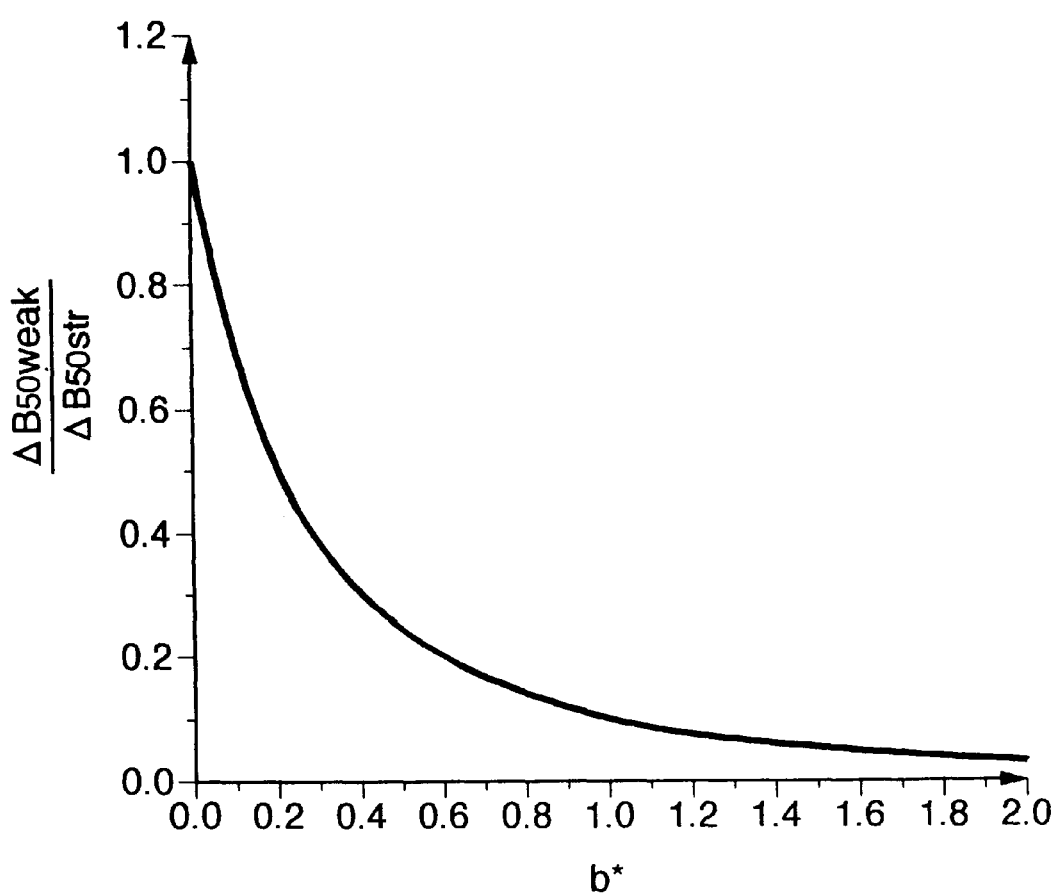
FIG. 5 is a graph showing the relation between the extrapolation length/liquid crystal layer thickness ratio and the index of reduction of luminance variation by the weak torsional anchoring effect.

The formula (6) is plotted in FIG. 5 with b* as abscissa and ΔB50weak/ΔB50str as ordinate. This graph shows that a slight enlargement of the extrapolation length/substrate gap ratio b* results in a sharp decrease of the above index ΔB50weak/ΔB50str, that is, produces a remarkable luminance variation reducing effect by weak torsional anchoring.

With reference to color vision of human being, Weber ratio is known as a criterion for recognizability of luminance difference, and it is said that the luminance difference of 10% can be recognized by human being. Therefore, by controlling alignment at the interface between the substrate and liquid crystal layer so that nonuniformity of display luminance will be confined to less than 10% by availing of the luminance variation reducing effect incidental to gap variation by said weak torsional anchoring, it is possible to obtain a liquid crystal display device which can make incognizable the nonuniformity of display luminance caused by gap variation which may occur in the manufacturing process of liquid crystal elements.

In an in-plane switching mode active-matrix liquid crystal display, an inter-substrate gap unevenness of about 0.5 $\mu$ is produced in the pixel section. So, when this is combined with an alignment layer (e.g. a rubbed alignment layer of a polyimide alignment layer material PIQ which gives the strong torsional anchoring and available from Hitachi Chemical Co., Ltd.), the display irregularity becomes about 14%.

Therefore, in order to confine the degree of display irregularity within said threshold value (10%) of luminance difference visibility so that the display luminance unevenness may not be recognized, it is necessary to provide a value smaller than 0.7 as the reduction index (ΔB50weak/ΔB50str), and this can be realized by making the extrapolation length/substrate gap ratio b* (see FIG. 5) greater than 0.1, that is, making the extrapolation length greater than 10% of the gap between the substrates.

Further, by adopting weak torsional anchoring for the alignment at the substrate/liquid crystal layer interface, it is possible to lower the drive voltage due to reduction of threshold voltage and to enhance the rise response speed.

Secondarily, according to the present invention, the torsional anchoring coefficient of the alignment layer surface for the liquid crystal molecules at the liquid crystal/alignment layer interface is set to be not greater than 20 $\mu$N/m in the in-plane switching mode.

In order to obtain, with the in-plane switching mode, the display performance equal to that of the TN mode, it is necessary to make the gap between the substrates (thickness of the liquid crystal layer) about 4 $\mu$m. In this case, for making the extrapolation length greater than 10% of the gap between the substrates, the extrapolation length b must be not less than about 0.4 $\mu$m. Since the twist elastic constant K2 of the practical liquid crystal compositions presently available in the art is not greater than about 8 pN, it is suggested to use an alignment layer material which can give weak torsional anchoring, with the torsional anchoring coefficient K2 at the alignment layer surface (as given from the equation (2)) being not greater than 20 $\mu$N/m.

Thirdly, in the present invention, an organic polymer containing an oligomer and/or polymer in which the polymerizate of long-chain alkylene groups and/or fluoro groups given in the amine or acid moiety is 5–30% of the total number of moles is used as an alignment layer material for obtaining weak torsional anchoring such as mentioned above.

In order to provide an extrapolation length which is not less than 10% of the gap between the substrates, it is desirable, as mentioned above, to use an alignment layer material which can give weak torsional anchoring with the torsional anchoring coefficient at the alignment layer surface being not greater than 20 $\mu$N/m. For obtaining such weak torsional anchoring, it is advised to use an alignment layer material in which long-chain alkylene groups and/or fluoro groups have been introduced at a rate above a prescribed level (5%).

It should be noted, however, that when the ratio of the copolymerized portion of long-chain alkylene groups and/or fluoro groups becomes higher than a certain level (30%), the tilt angle of the liquid crystal molecules at the interface may exceed 10° to cause nonuniform display due to nonuniformity of tilt angle in high-tilt alignment. Also, when the tilt angle exceeds 10°, the wide viewing-angle effect, which is one of the prominent advantages to the in-plane switching mode, is mostly lost.

Further, when the ratio of the copolymerized portion of long-chain alkylene groups and/or fluoro groups in the alignment layer material is elevated, the torsional anchoring coefficient A2 at the alignment layer surface may become lower than 1.0 $\mu$m/N, which tends to cause improper alignment and excessive lowering of decay response speed. It is therefore advised not to indiscreetly raise the ratio of said long-chain alkylene groups and/or fluoro groups.

In view of the above effects, it is advised to use an alignment layer in which the copolymerized portion of long-chain alkylene group and/or fluoro group is 5–30% of the total number of moles, as in the present invention, for obtaining an in-plane switching mode active-matrix liquid crystal display which is minimized in display irregularity and excellent in mass productivity.

Moreover, by use of an alignment layer comprising a polymer having introduced thereinto an oligomer which is lower in weight-average molecular weight than the conventional polymer (having a weight-average molecular weight of 100,000 or more) of long-chain alkylene group and/or fluoro group, printability is improved when a varnish is coated on the substrate by a printing method.

The polymer and/or oligomer constituting the long-chain alkylene groups and/or fluoro groups are preferably a polymer and/or oligomer-amic acid imide type, a polymer and/or oligomer-imide type, a polymer and/or oligomer-imidosiloxane type, a polymer and/or oligomer-amide imide type or the like, which have a weight-average molecular weight of 2,000–90,000 (converted to standard polystyrene) no matter whether they are main chain type, side chain type or terminal type.

Especially preferred for use in the present invention is an organic alignment layer in which the amine moiety comprises a single-ring rigid amine and the acid moiety comprises a polymer and/or oligomer-amic acid composed of an aliphatic tetracarboxylic acid dianhydride and/or alicyclic tetracarboxylic acid dianhydride and an aromatic tetracarboxylic acid dianhydride having main chain type long-chain alkylene groups and/or fluoro groups.

For preparation of the organic alignment layer of the present invention, a pertinent precursor, for example, a polymer and/or oligomer-amic acid type, a polymer and/or oligomer-amic acid imide type, a polymer and/or oligomer-imide type, a polymer and/or oligomer-imidosiloxane type, or a polymer and/or oligomer-amide-imide type, is coated on the substrate, followed by dehydration ring-closure, mixing and other necessary treatments.

The compounds constituting the amine moiety having long-chain alkylene groups and other copolymerizable compounds usable in the present invention include, for example, 1,8-diaminooctane, 1,10-diaminodecane, 1,12-diaminodecane, 2,4-diamino-3-methyl-stearylphenyl ether, 2,4-diamino-laurylphenyl ether, 2,4-diamino-palmitylphenyl ether, 2,4-diamino-1-octyloxybenzene, 2,2-bis[4-(p-aminophenoxy)phenyl)-octane, 2,2-bis[4-(p-aminophenoxy)phenyl]decane, 2,2-bis[4-(p-aminophenoxy)phenyl]tridecane, 2,2-bis[4-(p-aminophenoxy)phenyl]pentadecane, bis[4-(p-aminobenzoyl-oxy)benzoic acid]octane, bis[4-(p-aminobenzoyloxy)benzoic acid]octadecane, bis(p-aminoabenzoyloxy)octane, bis(p-aminobenzoyloxy)nonane, bis(p-aminobenzoyloxy)decane, bis(p-aminoabenzoyloxy)dodecane, bis(p-aminobenzoyloxy)tetradecane, bis(p-aminobenzoyloxy)octadecane, sebacic acid dihydrazide, p-phenylene-diamine, m-phenylenediamine, 4,4'-diaminodiphenyl ether, 3,3'-diaminodiphenyl ether, 4,4'-diaminodiphenylmethane, 3,3'-diaminodiphenylmethane, 4,4'-diaminodiphenyl sulfide, 4,4'-diaminodiphenylpropane, 3,3'-diaminodiphenylpropane, 4,4'-diaminodiphenylsulfone, 3,3'-diaminodiphenylsulfone, 1,5-diaminonaphthalene, 2,6-diaminonaphthalene, 4,4'-diaminoterphenyl, 1,1-methaxylenediamine, 1,4-diaminocyclohexane, isophthalic acid dihydrazide, adipic acid dihydrazide, succinic acid dihydrazide, 3,3'-dimethyl-4,4'-diaminodiphenylmethane, 3,3'-butyl-4,4'-diaminodiphenylmethane, 3,3'-dibutoxy-4,4'-diaminodiphenylmethane, 2,4-diamino-1-methoxymethylenebenzene, 2,4-diamino-1-butoxymethylenebenzene, 3,3'-dimethyl-4,4'-diaminodiphenyl ether, 3,3'-dimethyl-2,2'-diaminodiphenylmethane, 2,2-bis[4-(p-aminophenoxy)-phenyl]propane, 2,2-bis[4-(p-aminophenoxy)phenyl]butane, 2,2-bis[4-(p-aminophenoxy]pentane, 2,2-bis[4-(p-aminophenoxy)phenyl]hexane, 2,2-bis[4-(p-aminophenoxy)phenyl]methane, 2,2-bis[4-(p-aminophenoxy)phenyl]sulfone, 2,2-bis[4-(p-aminophenoxy)phenyl]ketone, 2,2-bis[4-(p-aminophenoxy)phenyl]biphenyl, 2,2-bis[4-(p-aminophenoxy)phenyl]cyclohexane, 2,2-bis[4-(p-aminophenoxy)phenyl]methylcyclohexane, 2,2-bis[4-(p-aminophenoxy)phenyl]propylcyclohexane, bis[4-(p-aminobenzoyloxy)benzoic acid]propane, bis[4-(m-aminobenzoyloxy)benzoic acid]propane, bis[4-(p-aminobenzoyloxy)benzoic acid]pentane, bis[4-(p-aminobenzoyloxy)benzoic acid]cyclohexane, bis[4-(p-aminobenzoyloxy)benzoic acid]methylcyclohexane, bis[4-(p-aminobenzoyloxy)benzoic acid]methane, bis[4-(p-aminobenzoyloxy)benzoic acid]butane, bis[4-(m-aminobenzoyloxy)benzoic acid]butane, bis[4-(p-aminomethylbenzoyloxy)benzoic acid]propane, bis[4-(p-aminoethylbenzoyloxy)benzoic acid]propane, bis[4-(p-aminobenzoyloxy)benzoic acid]heptane, bis(p-aminobenzoyloxy)propane, bis(p-aminobenzoyloxy)methane, bis(p-aminobenzoyloxy)ethane, bis(p-aminobenzoyloxy)butane, bis(p-aminobenzoyloxy)pentane, bis(p-aminobenzoyloxy)hexane, bis(p-aminobenzoyloxy)heptane, 2,2-bis[4-(4-aminophenoxy)phenyl]hexafluoropropane, 2,2-bis[4-(3-aminophenoxy)phenyl]hexafluoropropane, 2,2-bis[4-(2-aminophenoxy)-3,5-dimethylphenyl]hexafluoropropane, p-bis(4-amino-2-trifluoromethylphenoxy)benzene, 4,4'-bis(4-amino-2-trifluoromethylphenoxy)biphenyl, 4,4'-bis(4-amino-2-trifluoromethylphenoxy)diphenylsulfone, 1,4-bis(3-aminophenoxy)benzene, diaminosiloxane, and aminosiloxane.

The compounds constituting the acid moiety having long-chain alkylene groups and other copolymerizable compounds usable in the present invention include, for example, octylsuccinic dianhydride, dodecylsuccinic dianhydride, octylmalonic dianhydride, decamethylenebistrimellitic acid dianhydride, dodecanemethylenebistrimellitic acid dianhydride, 2,2-bis[4-(3,4-dicarboxyphenoxy)phenyl]octyltetracarboxylic acid dianhydride, 2,2-bis[4-(3,4-dicarboxylbenzoyloxy)phenyl]tridecanetetracarboxylic acid dianhydride, 2,2-bis[4-(3,4-dicarboxyphenoxy)phenyl]tridecanetetra-carboxylic acid dianhydride, stearic acid, stearic acid chloride, pyromellitic acid dianhydride, methylpyromellitic acid dianhydride, 3,3',4,4'-biphenyltetracarboxylic acid dianhydride, dimethylenetrimellitic acid dianhydride, 3,3',4,4'-biscyclohexanetetracarboxylic acid dianhydride, 3,3',4,4'-benzophenonetetracarboxylic acid dianhydride, 3,3',4,4'-diphenylmethanetetracarboxylic acid dianhydride, 3,3',4,4'-diphenylethertetracarboxylic acid dianhydride, 3,3',4,4'-diphenylsulfonetetracarboxylic acid dianhydride, 2,3,6,7-naphthalenetetracarboxylic acid dianhydride, 3,3',4,4'-diphenylpropanetetracarboxylic acid dianhydride, 2,2-bis[4-(3,4-dicarboxyphenoxy)phenyl]propanetetracarboxylic acid dianhydride, 2,2-bis[4-(3,4-dicarboxyphenoxy)phenyl]hexafluoropropanetetracarboxylic acid dianhydride, 2,2-bis[4-(3,4-dicarboxybenzoyloxy)phenyl]propanetetracarboxylic acid dianhydride, cyclopentanetetracarboxylic acid dianhydride, 1,2,3,4-cyclobutanetetracarboxylic acid dianhydride, bicyclo(2,2,2)octa-7-en-2,3,5,6-tetracarboxylic acid dianhydride, 1,2,3,4-cyclopentanetetracarboxylic acid dianhydride, and 1,2,3,4-butanetetracarboxylic acid dianhydride.

The compounds constituting the amine moiety having fluoro groups and other copolymerizable compounds usable in the present invention include, for example, 4-fluoro-methaphenylenediamine, 2,2-bis[4-(4-aminophenoxy)phenyl]hexafluoropropane, 2,2-bis[4-(3-aminophenoxy)phenyl]hexafluoropropane, 2,2-bis(2-aminophenoxy)-3,5-dimethylphenyl]hexafluoropropane, p-bis(4-amino-2-trifluoromethylphenoxy)benzene, 4,4'-bis(amino-2-trifluoromethylphenoxy)biphenyl, 4,4'-bis(4-amino-2-trifluoromethylphenoxy)diphenylsulfone, p-phenylenediamine, m-phenylenediamine, 4,4'-diaminodiphenyl ether, 3,3'-diaminodiphenyl ether, 4,4'-diaminodiphenylmethane, 3,3'-diaminodiphenylmethane, 4,4'-diaminodiphenyl sulfide, 4,4'-diaminodiphenylpropane, 3,3'-diaminodiphenylpropane, 4,4'-diaminodiphenylsulfone, 3,3'-diaminodiphenylsulfone, 1,5-diaminonaphthalene, 2,6-bis[3-(m-aminophenoxy)phenyl]biphenyl, 2,2-bis[4-(p-aminophenoxy)phenyl]cyclohexane, 2,2-bis[4-(p-aminophenoxy)phenyl]methylcyclohexane, 2,2-bis[4-(p-aminophenoxy)phenyl]propylcyclohexane, bis[4-(p-aminobenzoyloxy)benzoic acid]propane, bis[4-(m-aminobenzoyloxy)benzoic acid]propane, bis[4-(p-aminobenzoyloxy)benzoic acid]pentane, bis[4-(p-aminobenzoyloxy)benzoic acid]cyclohexane, bis[4-(p-aminobenzoyloxy)benzoic acid]methylcyclohexane, bis[4-(p-aminobenzoyloxy)benzoic acid]methane, bis[4-(p-aminobenzoyloxy)benzoic acid]butane, bis[4-(m-aminobenzoyloxy)benzoic acid]butane, bis[4-(p-aminomethylbenzoyloxy)benzoic acid]propane, bis[4-(p-aminoethylbenzoyloxy)benzoic acid]propane, bis[4-(p-aminobenzoyloxy)benzoic acid]heptane, bis(p-aminobenzoyloxy)propane, and bis(p-aminobenzoyloxy)methane.

The compounds constituting the acid moiety having fluoro groups and other copolymerizable compounds usable in the present invention include, for example, 2,2-bis[4-(3,4-dicarboxyphenoxy)phenyl]hexafluoropropanetetracarboxylic acid dianhydride, 2,2-bis[4-(3,4-dicarboxybenzoyloxy)-3-bromophenyl]

hexafluoropropanetetracarboxylic acid dianhydride, 2,2-bis[4-(3,4-dicarboxybenzoyloxy)-3,5-dibromophenyl]hexafluoropropanetetracarboxylic acid dianhydride, 2,2-bis[4-(3,4-dicarboxybenzoyloxy)-3,5-dimethylphenyl]hexafluoropropanetetracarboxylic acid dianhydride, 1,5-bis[4-(3,4-dicarboxybenzoyloxy)phenyl]decafluoropentanetetracarboxylic acid dianhydride, 1,6-bis[4-(3,4-dicarboxybenzoyloxy)phenyl]dodecafluorohexanetetracarboxylic acid dianhydride, 1,7-bis[4-(3,4-dicarboxybenzoxyloxy)phenyl]-tetradecafluoropentanetetracarboxylic acid dianhydride, 2,2-bis[4-(3,4-dicarboxybenzoyloxy)phenyl]octafluorobutane-tetracarboxylic acid dianhydride, 4,4'-diphenylethertetracarboxylic acid dianhydride, 3,3',4,4'-diphenylsulfonetetracarboxylic acid dianhydride, 2,3,6,7-naphthalenetetracarboxylic acid dianhydride, 3,3',4,4'-diphenylpropanetetracarboxylic acid dianhydride, 2,2-bis[3-(3,4-dicarboxyphenoxy)phenyl]propanetetracarboxylic acid dianhydride, 2,2-bis[4-(3,4-dicarboxybenzoyloxy)phenyl]propanetetracarboxylic acid dianhydride, cyclopentanetetra-carboxylic acid dianhydride, 1,2,3,4-cyclobutanetetracarboxylic acid dianhydride, bicyclo(2,2,2)octa-7-en-2,3,5,6-tetracarboxylic acid dianhydride, 1,2,3,4-cyclopentanetetracarboxylic acid dianhydride, and 1,2,3,4-butanetetracarboxylic acid dianhydride.

The solvents usable in the present invention are those having polarity such as, for example, N-methyl-2-pyrrolidone, dimethylformamide, dimethylacetamide, dimethyl sulfoxide, sulforan, butyl lactone, cresol, phenol, cyclohexanone, dimethylimidazolidinone, dioxane, tetrahydrofuran, butyl cellosolve, butyl cellosolve acetate, and acetophenone.

In the organic polymer, an amino-based silane coupling agent such as γ-aminopropylethoxysilane, δ-aminopropylmethyldiethoxysilane or N-β(aminoethyl)γ-aminopropyltrimethoxysilane, an epoxy-based silane coupling agent, a titanate coupling agent, or a surface treating agent such as aluminum alcoholate, aluminum chilate or zirconium chilate may be mixed or reacted. The alignment layer may be formed by the commonly used methods such as spin coating, printing, brush coating, spraying, etc.

As the liquid crystals, there can be used, for example, 4-substited-phenyl-4'-substituted cyclohexanes, 4-substituted-cyclohexyl-4'-substituted cyclohexanes, 4-substituted-phenyl-4'-substituted dicyclohexanes, 4-substituted-dicyclohexyl-4'-substituted diphenyls, 4-substituted-4'-substituted-terphenyls, 4-substituted-biphenyl-4'-substituted-cyclohexanes, 2-(4-substituted-phenyl)-5-pyrimidines, 2-(4-substituted-dioxane)-5-phenyls, 4-substituted-benzoic acid-4'-phenyl esters, 4-substituted-cyclohexanecarboxylic acid-4'-substituted-phenyl esters, 4-substituted-cyclohexanecarboxylic acid-4'-substituted-biphenyl esters, 4-(4-substituted-cyclohexanecarbonyloxy)benzoic acid-4'-substituted-phenyl esters, 4-(4-substituted-cyclohexyl)benzoic acid-4'-substituted-phenyl esters, 4-(4-substituted-cyclohexyl)benzoic acid-4'-substituted-cyclohexyl esters, and 4-substituted-4'-substituted-biphenyls. Of these compounds, the polycomponent mixed liquid crystal compositions having an alkyl, alkoxyl, alkoxymethylene, cyano, fluorine, difluorine or trifluorine group at least one terminal of the molecule are preferably used.

In the present invention, as a fourth feature thereof, a layer of an inorganic material, preferably an inorganic alignment layer surface-treated by oblique evaporation method may be used as another alignment layer for providing weak torsional anchoring such as mentioned above.

As prior art resembling the present invention, there has been known a technique for limiting reduction of the production yield due to rubbing in the in-plane switching mode by using a liquid crystal composition to which the chiral molecules have been added, and making a liquid crystal element in which only the polyimide alignment layer on one of the substrate surfaces has been rubbed for controlling alignment and no rubbing has been performed on the polyimide alignment layer on the other substrate surface (JP-A 7-110481).

According to this prior art, however, in order to prevent nonuniformity of alignment during injection of the liquid crystal composition, it is necessary to inject the composition in between the substrates in an isotropic phase by heating the composition, and then gradually cool the composition by applying an electric or magnetic field. An excessively long time is required for this step for obtaining an element with little nonuniformity of alignment, so that this technique is unsuited for the industrial production process.

Also, addition of the chiral molecules necessary for preventing nonuniformity of alignment presents a difficult problem in setting the property values of the optimal liquid crystal composition.

The above problem can be overcome by using an inorganic alignment layer having the alignability provided by oblique evaporation as in the present invention, instead of forming a polyimide alignment layer with no rubbing treatment as in the prior art, on one of the substrate surfaces.

By this means, it is possible to impart to the surfaces of both of the pairing substrates an aligning ability of such a degree as will not cause nonuniformity of alignment even if the liquid crystal composition is injected in its liquid crystal phase without heating. Also, since the liquid crystal molecules on the substrate surface having controlled alignment by oblique evaporation of an inorganic material such as silicon oxide show far weaker torsional anchoring than the liquid crystal molecules on a generally used rubbed polyimide alignment layer, a significant effect of reducing display irregularity by such weak torsional anchoring can be expected.

Further, by differentiating the torsional anchoring force from one substrate surface to the other, that is, by providing strong torsional anchoring on one of the substrate surface by rubbing the polyimide alignment layer while providing weak torsional anchoring on the other substrate surface by oblique evaporation of silicon oxide, instead of conducting alignment control so as to provide weak torsional anchoring on the surfaces of both of the pairing substrates as in the prior art, it is possible to easily realize both of stable control of alignment and reduction of display irregularity.

With reference to the wide viewing angle effect credited to the in-plane switching mode, generally the smaller the tilt angle of the liquid crystal molecules on the substrate surface, the better is the viewing angle effect, with the widest viewing angle being provided theoretically when the tilt angle is 0°. In the case of the organic alignment layer whose alignment has been controlled by rubbing, it is difficult to make 0° the tilt angle of the liquid crystal molecules on the layer surface, but it is known that the tilt angle can be easily approximated to 0° for the liquid crystal molecules on the surface whose alignment has been controlled by oblique evaporation of an inorganic material such as silicon oxide.

Therefore, by providing an inorganic material layer controlled in its alignment by oblique evaporation on one of the substrate surfaces as in the present invention, it is possible to minimize nonuniformity of injection of the liquid crystal composition and display irregularity in operation, and even better viewing angle effect can be obtained.

According to another feature of the present invention, a group of electrodes for applying an in-plane electric field to the liquid crystal layer and the active elements are formed on only one of the pairing substrates, and an inorganic material layer is provided on this substrate side.

It has been proposed (e.g. in JP-A 6-160878) to dispose these electrodes and active elements on one substrate side alone. In the case of an active-matrix liquid crystal display having such a structure, as compared with the conventional TN mode active-matrix liquid crystal display having the electrodes formed on both of the pairing substrates, the ionic impurities contained in the liquid crystal composition exist biased in the substrate on the electrode side due to the electrode potential given at the time of liquid crystal driving, which greatly affects the surface properties such as retention characteristics of the substrate.

These maldistributed ionic impurities interact with various polar groups in the organic material or the residual polar organic solvent to cause display troubles such as image retention or sticking, especially when an organic alignment layer such as a polyimide layer is formed on the electrode-provided side of the substrate surface.

Such a problem can be solved by forming an inorganic material layer on the substrate surface contacting the liquid crystal layer of the substrate on the electrode-provided side.

Further, provision of an inorganic material layer on the substrate surface makes it possible to make alignment control not by rubbing but by oblique evaporation, which contributes to preventing reduction of yield due to static breakdown of the active elements by generation of static electricity incidental to the rubbing works, which has been a complex problem in the art.

Thus, by providing the electrodes and active elements only on the substrate side having an inorganic material layer, it becomes possible to prevent or minimize display troubles such as image retention and sticking as well as breakdown of the active elements by static electricity, thus realizing a remarkable improvement of production yield.

In still another embodiment of the present invention, a photo-reactive material layer, especially a photo-reactive layer which has been subjected to linearly polarized light irradiation to selectively derive a photochemical reaction, may be used as another alignment layer for providing weak torsional anchoring mentioned above.

The photo-reactive alignment layer is a conventional alignment control means with which it has been considered difficult to provide strong torsional anchoring and a sufficient (more than several degrees (°) of) interfacial tilt angle, but its weak torsional anchoring is favorable for realization of the present invention, and further, since in the in-plane switching mode there is no need of providing an interfacial tilt in principle unlike in the conventional TN mode, this means is capable of improving the practical aspects of display such as mass productivity in combination with the in-plane switching mode.

Further, it is known that, in the in-plane switching mode, the smaller the interfacial tilt angle, the better becomes the viewing angle characteristics. Since small interfacial tilt angle is favorable for said photoreactive alignment layer, good viewing angle characteristics can be expected from provision of this layer.

The present invention is further illustrated by the following Examples.

EXAMPLE 1

A pair of surface-polished 1.1 mm transparent glass substrates were prepared. Thin-film transistors and wiring electrodes were formed on one of the substrates, and this substrate was further coated with an insulating protective layer (gate insulating layer 2) made of silicon nitride.

The matrix element comprising said thin-film transistors and wiring electrodes is not particularly limited; any type is usable as far as an in-plane electric field can be applied thereto. Its producing method is omitted here as it does not constitute any essential part of the present invention.

FIG. 6 shows a front view, as taken from the direction vertical to the substrate plane, of the structures of the thin-film transistors and various types of electrodes and side sectional views taken along the lines A–A' and B–B'. Substrates are not shown here.

Each thin-film transistor unit 14 comprises pixel electrodes (source electrodes) 4, a signal electrode (drain electrode) 3, a scanning electrode (gate electrode) 12, and amorphous silicon 13.

The common electrodes 1 and scanning electrode 12 are constituted from the same metal layer patterned after the substrate not shown.

Likewise, the signal electrode 3 and pixel electrodes 4 are constituted from the same patterned metal layer formed on a gate insulating layer 2. As is evident from the front view, the pixel electrodes 4 are disposed between the three common electrodes 1.

The pixel pitch is 100 $\mu$m in the transverse direction (i.e. between the signal wiring electrodes) and 300 $\mu$m in the longitudinal direction (i.e. between the scanning wiring electrodes).

The electrode size was so selected that the wiring section (the section extending parallel to the scanning wiring electrodes) of the scanning electrode 12, signal electrode 3 and common electrode 1, which constitute the wiring electrodes stretching across the plural pixels, will have a greater-than-usual area to avoid line defect. The widths of said scanning electrode, signal electrode and common electrode were 10 $\mu$m, 8 $\mu$m and 8 $\mu$m, respectively.

In order to increase aperture ratio, the pixel electrode 4 and common electrode formed independently for each pixel unit were somewhat lessened (to 5 $\mu$m and 6 $\mu$m, respectively) in the width of the portion extending in the longitudinal direction of the signal wiring electrode.

Narrowing of the electrode width increases the possibility of disconnection or breaking of wire due to mixing of contaminants, but in this case, it can only cause a partial fault of one pixel and never invites line defect.

The signal electrodes 3 and common electrodes 1 were provided at intervals of 2 $\mu$m, with an insulating layer interposed therebetween.

The number of the pixels was 640×3×480 since there were provided 640×3 (R, G and B) of signal wiring electrodes and 480 wiring electrodes.

Then a solution of a solvent-soluble type polyimide precursor RN-1046 (produced by Nissan Chemical Co., Ltd.) was applied on the substrate, heated to 200° C., and allowed to stand in this state for 30 minutes to remove the solvent, thus forming a high-density polyimide alignment layer. The surface of this alignment layer was rubbed with a buffing cloth secured to the rubbing rollers to impart an aligning ability to the layer.

A color filter having a light shielding layer was formed on the other substrate, and the polyimide alignment layer formed on its outermost surface in the same way as described above was rubbed to afford liquid crystal alignability.

Rubbing was employed as means for imparting alignability in the instant example, but it is possible to use other methods such as forming a multi-layer film with good aligning performance by raising up and laying on the substrate an organic molecular film spread on the water surface. This method comprising spreading of a molecular film on the water surface is an alignment control method which has been considered unable to provide a sufficiently large interfacial tilt angle, but since in the in-plane switching mode no interfacial tilt is required in principle unlike in the conventional TN mode, this method, when combined with the in-plane switching mode, is capable of improving practicality such as mass productivity of the device.

Further, it is known that, in the in-plane switching mode, the smaller the interfacial tilt angle, the better become the viewing angle characteristics. Diminishment of the interfacial tilt angle is favorable for said alignability imparting method comprising spreading of the molecular film on the water surface, so improvement of viewing angle characteristics of the film can be expected.

Then these two substrates were placed one on the other so that the surfaces thereof having the liquid crystal alignability would face each other, and joined together with the intermedium of spacers composed of dispersed spherical polymer beads and sealant along the edges to assemble a cell. The rubbing directions of the two substrates were substantially parallel to each other, and the angle defined by this direction with the applied in-plane field direction was set to be 75°.

Then a nematic liquid crystal composition having a positive dielectric anisotropy $\Delta\epsilon$ of 9.0 (1 kHz, 20° C.), a refractive index anisotropy $\Delta n$ of 0.08 (590 nm, 20° C.) and a twist elastic constant K2 of 7.0 pN was injected in between the substrates of said liquid crystal cell in vacuo, and the cell was closed by a sealant composed of an ultraviolet curing resin to produce a liquid crystal panel.

There were prepared 6 liquid crystal panels having a liquid crystal layer thickness (gap) d of 4.7±0.7 μm in an encapsulated state of liquid crystal with said spacers. Thus, retardation ($\Delta n d$) of these panels was 0.32–0.432 μm.

These panels were held by two polarizers (G1220DU mfd. by Nitto Denko KK), with the polarized light transmission axis of one of the polarizers being arranged substantially parallel to the rubbing direction and the transmission axis of the other polarizer arranged orthogonal thereto to provide the normally closed characteristics that give dark display with a low voltage and bright display with a high voltage. Then the structure was worked into a module by connecting the drive circuits, back light unit and other necessary parts to obtain a liquid crystal display device.

Then by using the same alignment layer material (G1220DU of Nitto Denko KK) as employed in the above display device, an alignment layer was formed on a glass substrate and rubbed by the same process, and the same liquid crystal composition was encapsulated to make a liquid crystal cell. Its extrapolation length, which shows the torsional anchoring strength at the interface between the liquid crystal molecules and the alignment layer surface, was measured by the Fredericksz transition method (Yang: Appl. Phys. Lett., 43(1), 1983, pp.62–64). It was determined to be 1.0 μm.

Here, the principle of the Fredericksz transition method used for determination of extrapolation length is explained.

This method briefly comprises determining the extrapolation length from the equation (1) expressing the dependency of the threshold value Vc of Fredericksz transition mentioned above on the liquid crystal layer thickness d.

The equation (1) may be transformed into the following equation by giving specific attention to the liquid crystal layer thickness d and the threshold value Vc of Fredericksz transition:

$$(1/Vc) = (d+2b) \times \pi g \sqrt{(\Delta\epsilon/K2)} \tag{7}$$

There were prepared a plural number of liquid crystal cells differing only in liquid crystal layer thickness from each other, and the measurements thereof were plotted with the liquid crystal layer thickness d as abscissa (x axis) and 1/Vc determined for each cell as ordinate (y axis). The section y where these points were extrapolated with a straight line gives $-2b$, i.e. the extrapolation length (the factor 2 in this expression indicates contributions to the extrapolation length from both interfaces in case the upper and lower interfaces were supposed to be identical).

This determination method allows accurate determination only in the case of weak torsional anchoring where the extrapolation length becomes substantially comparable to the liquid crystal layer thickness in principle.

As the extrapolation length determination methods applicable to the case of strong torsional anchoring, there are known, for instance, a strong electric field method (Yokoyama, et al: J. Appl. Phys., 57(10), 1985, pp. 4520–4526) and a method for determining minute interfacial torsions (Akabane, et al: Jpn. J. Appln. Phys., Vol. 35 (1996), pp. 4434–4436). In the case of weak torsional anchoring envisioned in the present invention, the determinations by any of these determination methods are much the same and well reliable.

The ratio b* of the extrapolation length b to the gap between the substrates, as calculated from the above-determined extrapolation length with a central gap of 4.7 μm, was 0.213.

The torsional anchoring coefficient A2 on the alignment layer surface can be immediately determined from the extrapolation length b and twist elastic constant K2 of the liquid crystals, by using the following equation which was derived from the equation (2):

$$A2 = K2/b \tag{8}$$

Therefore, in the case of the instant Example, A2=7.0 μN/m.

Figure 7:
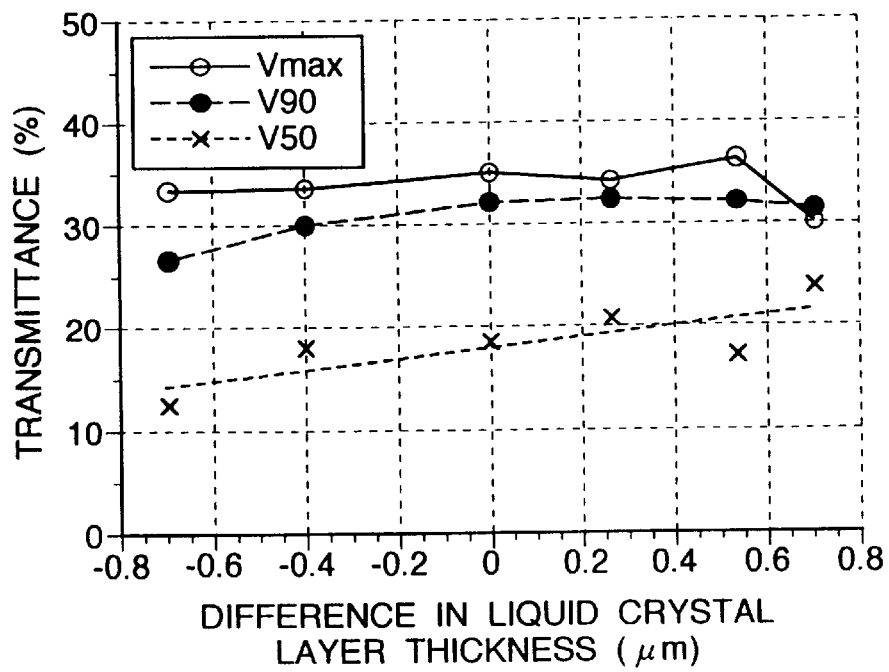
FIG. 7 is a graph showing the results of determinations in an example of the present invention.

Determination of the display performance of the above-described liquid crystal display device by a photoelectric photometer gave the results noted by very small change of transmittance expressed as a vertical axis of coordinates where the liquid crystal layer thickness difference was represented by the horizontal axis, with the center value of 4.7 μm as reference (0), either when a voltage Vmax which gives the maximum transmittance was applied or when the voltages V90 and V50 which give 90% and 50%, respectively, of the maximum transmittance were applied as shown in FIG. 7.

In order to make quantitative determination of display irregularity, the image on the display section taken by a CCD camera in a state of intermediate tone display where display irregularity appears most conspicuously, and the contrast of the maximum luminance irregularity (after elimination of the gentle luminance shading stretching over the wide range of the whole display section not recognized as display irregularity) was determined. It was about 0.5%.

In the visual image quality test, there was also observed no display irregularity due to the difference in liquid crystal layer thickness of the liquid crystal panels, and high-uniformity display was obtained.

EXAMPLE 2

The procedure of Example 1 was carried out except for use of RN-763 (a product by Nissan Chemical Co., Ltd.) as the alignment layer material to make a liquid crystal display device with a liquid crystal layer thickness d of 4.0 µm.

The extrapolation length b of this device was determined by the Fredericksz transition method as in Example 1, finding b=1.49 µm, hence b* (ratio of the extrapolation length b to the gap)=0.3725.

The contrast of the maximum luminance irregularity determined in the same way as in Example 1 was about 0.3%. Also, no display irregularity due to the difference in liquid crystal layer thickness of the obtained liquid crystal panels was observed in the visual image quality test, and thus high-uniformity display was obtained.

EXAMPLE 3

The procedure of Example 1 was followed except for use of AL-1051 (produced by Japan Synthetic Rubber Co., Ltd.) as the alignment layer material to make a liquid crystal display device with a liquid crystal layer thickness d of 4.0 µm.

The extrapolation length b of this device determined in the same way as in Example 1 was 1.50 µm, and the ratio b* of the extrapolation length b to the gap was 0.375.

Contrast of the maximum luminance irregularity was about 0.3% and the visual image quality test showed no display irregularity due to the difference in liquid crystal layer thickness of the liquid crystal panels, confirming high-uniformity display of the present device.

EXAMPLE 4

Following the procedure of Example 1 except for use of AL-3046 (product by Japan Synthetic Rubber Co., Ltd.) as the alignment layer material, a liquid crystal display device with a liquid crystal layer thickness d of 4.0 µm was produced. b=1.50 µm; b*=0.375.

Contrast of the maximum luminance irregularity was determined to be about 0.3%. The visual image quality test showed no sign of display irregularity due to the difference in liquid crystal layer thickness of the liquid crystal panels and confirmed high-uniformity display.

EXAMPLE 5

Following the procedure of Example 1 except for the alignment layer material and the liquid crystal composition, there were produced 5 liquid crystal panels ranging in liquid crystal layer thickness (gap) d from 5.0+0.55 µm to 5.0–0.75 µm.

For forming the alignment layer, 1.0 mol% of p-phenylenediamine was dissolved in N-methyl-2-pyrrolidone, to which 0.3 mol% (30% of the total number of moles) of decamethylenebistrimellitic acid dianhydride and 0.7 mol% of 1,2,3,4-butanetetracarboxylic acid dianhydride were added and reacted to prepare a polyamic acid varnish. This varnish was diluted to 6% concentration and, after adding γ-aminopropyltriethoxysilane in an amount of 0.3 wt% as solid, subjected to printing work and heat treatment at 210° C. for 30 minutes to form an approximately 800 Å dense polyimide alignment layer.

A nematic liquid crystal composition having a positive dielectric anisotropy $\Delta\epsilon$ of 10.2 (1 kHz, 20° C.), a refractive index anisotropy $\Delta n$ of 0.075 (590 nm, 20° C.) and a twist elastic constant $K_2$ of 5.0 pN was used. Retardation ($\Delta nd$) of the five liquid crystal panels was 0.32–0.42 µm.

The extrapolation length b, which indicates torsional anchoring strength at the interface between the liquid crystal molecules and the alignment layer surface, was determined with this display device by the Fredericksz transition method in the same way as in Example 1, finding b=1.0 µm. Hence, the ratio b* of the extrapolation length b to the gap, calculated with the center gap of 5.0 µm, was 0.2, and the torsional anchoring coefficient $A_2$ of the alignment layer surface was 5.0 µM/m.

The tilt angle at the boundary of the substrate as measured by the crystal rotation method was 3°.

Figure 8:
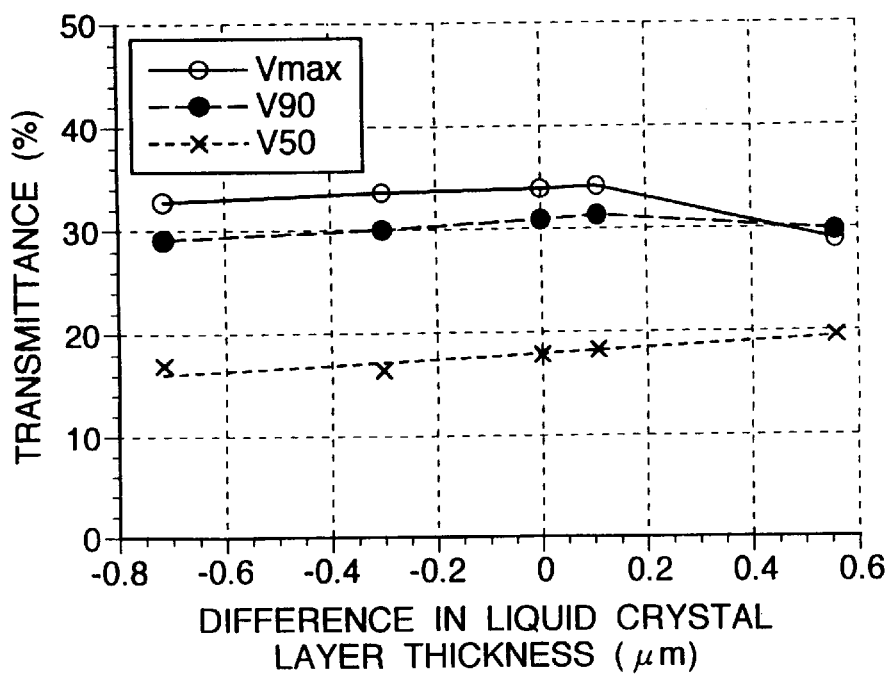
FIG. 8 is a graph showing the results of determinations in another example of the present invention.

The display performance of said liquid crystal display device was determined by a photoelectric photometer to find that the device had the characteristic of being very small in change of transmittance with difference in liquid crystal layer thickness, either when a voltage Vmax which gives the maximum transmittance was applied or when a voltage V50 which gives 50% of the maximum transmittance was applied, as shown in the graph of FIG. 8 where transmittance is plotted as ordinate and difference in liquid crystal layer thickness as abscissa, with the center value of 5.0 µm as reference (0). In order to make qualitative determination of display irregularity, the image of the display section was taken by a CCD camera in a state of intermediate tone display where display irregularity appears most conspicuously, and contrast of the maximum luminance irregularity (after removal of the gentle luminance shading stretching over the wide range of the whole display section not recognized as display irregularity) was determined. It was about 0.3%.

In the visual image quality test, there was seen no display irregularity due to the difference in liquid crystal layer thickness of the liquid crystal panels, and high-uniformity display was obtained.

EXAMPLE 6

In the same way as in Example 5 excepting the alignment layer material used, 1.0 mol% of m-phenylenediamine was dissolved in N-methyl-2-pyrrolidone, to which 0.25 mol% (25% of the total number of moles) of 2,2-bis[4-(3,4-dicarboxyphenoxy)phenyl]tridecanetetracarboxylic acid dianhydride was added and reacted at 40° C. for one hour to synthesize an oligomer having a polystyrene-reduced weight-average molecular weight of about 60,000. Then 0.75 mol% of 1,2,3,4-butanetetracarboxylic acid dianhydride was added thereto and reacted at 20° C. for 15 hours and then at 130° C. for 30 minutes to obtain a poly-oligomer-amic acid imide varnish. This varnish was diluted to 6% concentration and, after adding 0.3 wt% (as solid) of γ-aminopropyltriethoxysilane, subjected to printing work and heat treatment at 230° C. for 30 minutes to form an about 700 Å dense polyimide alignment layer. A liquid crystal display device having this alignment layer and a liquid crystal layer thickness d of 4.0 µm was made. The extrapolation length b determined by the Fredericksz transition method was 0.9 µm, and b* (extrapolation length/gap rasio) was 0.225.

Contrast of the maximum luminance irregularity determined in the same way as in Example 1 was about 0.2%. Also, the visual image quality test showed no display irregularity due to the difference in liquid crystal layer thickness of the liquid crystal panels and assured high-uniformity display.

EXAMPLE 7

In the same manner as Example 5 excepting the alignment layer material used, 0.3 mol% (30% of the total number of moles) of 1,12-diaminododecane was dissolved in a mixture of N-methyl-2-pyrrolidone and dimethylacetamide, followed by the addition thereto of 1.0 mol% of 1,2,3,4-cyclopentanetetracarboxylic acid dianhydride and 30-minute reaction at 60° C. to synthesize an oligomer having a polystyrene-reduced weight-average molecular weight of about 4,000. Further, 0.6 mol% of 4,4'-diaminodiphenylmethane and 0.1 mol% of diaminosiloxane were added to the oligomer and reacted at 20° C. for 12 hours and then at 150° C. for 30 minutes to produce a poly-oligomer-amic acid siloxane varnish. This varnish was diluted to 6% concentration, to which γ-aminopropyltriethoxysilane was added in an amount of 0.3 wt% as solid, and the resulting preparation was subjected to printing work and heat treatment at 220° C. for 30 minutes to form an about 600 Å dense polyimidosiloxane alignment layer, and a liquid crystal display device having this alignment layer and a liquid crystal layer thickness d of 4.0 μm was made. When measured as in Example 1, b=0.48 μm; and b*=0.12. Contrast of maximum luminance irregularity was about 0.6. In the visual image quality test, no display irregularity due to the difference in liquid crystal layer thickness of the liquid crystal panels was observed, and high-uniformity display was obtained.

EXAMPLE 8

In the similar manner as Example 5, 0.2 mol% (20% of the total number of moles) of 2,4-diaminolaurylphenyl ether was dissolved in N-methyl-2-pyrrolidone, to which 1.0 mol% of 3,3',4,4'-biscyclohexanetetracarboxylic acid dianhydride was added and reacted at 50° C. for one hour to synthesize an oligomer having a polystyrene-reduced weight-average molecular weight of about 30,000. To this oligomer were added 0.6 mol% of bis(p-aminobenzoyloxy) methane and 0.2 mol% of isophthalic hydrazide to carry out reaction at 20° C. for 15 hours and then at 100° C. for one hour to produce a poly-oligomer-amic acid varnish. This varnish was diluted to 6% concentration and, after addition of 0.3 wt% (as solid) of γ-aminopropyltriethoxysilane, subjected to printing work and heat treatment at 200° C. for 30 minutes to form an about 600 Å dense polyalmide-imide alignment layer, and a liquid crystal display device having this alignment layer with a liquid crystal layer thickness d of 4.0 μm was made. When measured as in Example 1, b=1.0 μm; and b*=0.25. Contrast of maximum luminance irregularity was about 0.5%. The visual image quality test detected no display irregularity due to the difference in liquid crystal layer thickness of the liquid crystal panels and endorsed high-uniformity display of this display device.

EXAMPLE 9

In a similar manner as Example 5, 0.5 mol% of bis(p-aminobenzoyloxy)methane and 0.5 mol% of 4,4'-diaminodiphenylmethane were dissolved in N-methyl-2-pyrrolidone, to which 0.2 mol% (20% of the total number of moles) of octylsuccinic acid dianhydride was added and reacted at 40° C. for one hour to synthesize an oligomer having a polystyrene-reduced weight-average molecular weight of about 3,000. Further, 0.8 mol% of 1,2,3,4-butanetetracarboxylic acid dianhydride was added for reacting at 20° C. for 12 hours and then at 130° C. for one hour to form a poly-oligomer-amic acid imide varnish. This varnish was diluted to 6% concentration, then 0.3 wt% (as solid) of γ-aminopropyltriethoxysilane was added, and the preparation was subjected to printing work and heat treatment at 230° C. for 30 minutes to form an about 600 Å dense polyimide alignment layer, and a liquid having this alignment layer with a liquid crystal layer thickness d of 4.0 μm was made. When measured as in Example 1, b=1.5 μm; and b*=0.375. Contrast of maximum luminance irregularity was about 0.4%. The visual image quality test detected no display irregularity due to the difference in liquid crystal layer thickness of the liquid crystal panels and certified high-uniformity display of the produced display device.

EXAMPLE 10

In the similar manner as Example 5, 0.2 mol% of 2,2-bis [4-(3,4-dicarboxybenzoyloxy)-3,5-dimethylphenyl] hexafluoropropanetetracarboxylic acid dianhydride was added to a 1.0 mol% solution of p-phenylenediamine in N-methyl-2-pyrrolidone and reacted at 50° C. for one hour to synthesize an alignment material layer containing main chain type fluoro groups and having a polystyrene-reduced weight-average molecular weight of about 80,000. Then 0.8 mol% of 1,2,3,4-cyclobutanetetracarboxylic acid dianhydride was added thereto and reacted at 20° C. for 12 hours to obtain a poly-oligomer-amic acid varnish in which the proportion of the oligomer containing fluoro groups was about 20%. This varnish was diluted to 6% concentration and then 0.3 wt% (as solid) of γ-aminopropyltriethoxysilane was added thereto, followed by printing work and heat treatment at 200° C. for 30 minutes to form an about 800 Å dense polyimide alignment layer.

There were produced 4 liquid crystal panels having this alignment layer and ranging in liquid crystal layer thickness (gap) d from approximately 4.8+0.2 to 4.8–0.8 μm in an encapsulated state of liquid crystal. Retardation (Δnd) of these panels was 0.30–0.38 μm. When measured as in Example 1, b=1.0 μm; and b*=0.208.

Determination of display performance of the above liquid crystal display device by a photoelectric photometer showed very small change of transmittance with difference in crystal layer thickness as seen in the graph of FIG. 9 where transmittance is plotted as ordinate and difference in liquid crystal layer thickness as abscissa with the center value of 4.8 μm as reference (0), either when a voltage Vmax which gives the maximum transmittance was applied or when a voltage V50 which gives 50% of the maximum transmittance was applied. For making quantitative determination of display irregularity, the image of the display section was taken by a CCD camera in a state of intermediate tone display where display irregularity appears most conspicuously, and contrast of maximum luminance irregularity (after removal of gentle luminance shading stretching over the wide region of the whole display section not recognized as display irregularity) was determined. It was about 0.4%. In the visual image quality test, there was observed no display irregularity due to the difference in liquid crystal layer thickness of the liquid crystal panels and high-uniformity display was obtained.

EXAMPLE 11

In the similar manner as Example 5, 0.1 mol% of 1,5-bis [4-(3,4-dicarboxybenzoyloxy)phenyl] decafluoropentanetetracarboxylic acid dianhydride was added to a 1.0 mol% solution of m-phenylenediamine in N-methyl-2-pyrrolidone and reacted at 40° C. for 2 hours to synthesize an oligomer containing side chain type fluoro groups and having a polystyrene-reduced weight-average molecular weight of about 4,000. Then 0.9 mol% of 1,2,3, 4-butanetetracarboxylic acid dianhydride was added to the oligomer and reacted at 20° C. for 8 hours and then at 130°

C. for one hour to produce a poly-oligomer-amic acid imide varnish in which the proportion of the oligomer containing fluoro groups was about 10%. This varnish was diluted to 6% concentration, to which 0.3 wt% (as solid) of γ-aminopropyltriethoxysilane was added, followed by printing work and heat treatment at 200° C. for 30 minutes to form an about 700 Å dense polyimide alignment layer. A liquid crystal display device having this alignment layer with a liquid crystal layer thickness d of 4.0 μm was made. When measured as in Example 1, b=0.9 μm; and b*=0.225.

For quantitative determination of display irregularity, the image at a 20 mm square area of the display section was taken by a CCD camera in a state of intermediate tone display where display irregularity appears most conspicuously, and contrast of maximum luminance irregularity was determined. It was about 0.5%. The visual image quality test detected no display irregularity due to the difference in liquid crystal layer thickness of the liquid crystal panels, endorsing high-uniformity display by the present display device.

EXAMPLE 12

According to the procedure of Example 5, 1.0 mol% of 1,2,3,4-cyclopentanetetracarboxylic acid dianhydride was added to a 0.25 mol% solution of 2,2-bis[4-(4-aminophenoxy)phenyl]hexafluoropropane in a mixture of N-methyl-2-pyrrolidone and dimethylacetamide and reacted at 80° C. for one hour to synthesize an oligomer containing main chain type fluoro groups and having a polystyrene-reduced weight-average molecular weight of about 15,000. Then 0.6 mol% of 4,4'-diaminodiphenylmethane and 0.05 mol% of diaminosiloxane were added to the oligomer and reacted at 20° C. for 5 hours and then at 150° C. for 3 hours to obtain a poly-oligomer-imidosiloxane varnish in which the proportion of the oligomer containing fluoro groups was about 25%. This varnish was diluted to 6% concentration, and after adding thereto 0.3 wt% (as solid) of γ-aminopropyltriethoxysilane, the preparation was subjected to printing work and heat treatment at 200° C. for 30 minutes to form an about 700 Å dense polyimidosiloxane alignment layer. A liquid crystal display device having this alignment layer with a liquid crystal layer thickness d of 4.0 μm was made. When measured as in Example 1, b=0.4 μm; and b*=0.1.

For quantitative determination of display irregularity, the image at a 20 mm² area of the display section was taken by a CCD camera in a state of intermediate tone display where display irregularity appears most conspicuously, and contrast of maximum luminance irregularity was determined. It was about 2%. In the visual image quality test, there was observed no display irregularity due to the difference in liquid crystal layer thickness of the liquid crystal panels and high-uniformity display was obtained.

EXAMPLE 13

In accordance with Example 5, 1.0 mol% of 3,3',4,4'-biscyclohexanetetracarboxylic acid dianhydride was added to a 0.2 mol% solution of 4-fluoromethaphenylenediamine in N-methyl-2-pyrrolidone and reacted at 40° C. for one hour to synthesize an alignment layer material containing side chain type fluoro groups and having a polystyrene-reduced weight-average molecular weight of about 90,000. 0.6 mol% of bis(p-aminobenzoyloxy)methane and 0.2 mol% of isophthalic hydrazide were added to the oligomer and reacted at 20° C. for 8 hours and then at 100° C. for 2 hours to produce a poly-oligomer-amide-imide varnish in which the proportion of the oligomer containing fluoro groups was about 20%. This varnish was diluted to 6% concentration and then 0.3 wt% (as solid) of γ-aminopropyltriethoxysilane was added, followed by printing work and heat treatment at 200° C. for 30 minutes to form an about 600 Å dense polyamide-imide alignment layer, and a liquid crystal display device with a liquid crystal layer thickness d of 4.0 μm was made. When measured as in Example 1, b=1.1 μm; and b*=0.275.

For quantitative determination of display irregularity, the image at a 20 mm² area of the display section was taken by a CCD camera in a state of intermediate tone display where display irregularity appears most conspicuously, and contrast of maximum luminance irregularity was determined. It was about 5%. In the visual image quality test, there was found no display irregularity attributable to the difference in liquid crystal layer thickness of the liquid crystal panels and high-uniformity display was obtained.

EXAMPLE 14

In the similar manner as Example 5, 0.5 mol% of m-phenylenediamine and 0.5 mol% of 4,4'-diaminodiphenylmethane were dissolved in N-methyl-2-pyrrolidone, and 0.2 mol% of trifluorosuccinic dianhydride was added thereto and reacted at 40° C. for 2 hours to synthesize an oligomer containing terminal type fluoro groups and having a polystyrene-reduced weight-average molecular weight of about 2,000. Then 0.9 mol% of 1,2,3,4-butanetetracarboxylic acid dianhydride was added to the oligomer and reacted at 20° C. for 8 hours and then at 100° C. for 2 hours to produce a poly-oligomer-imide varnish in which the proportion of the oligomer containing fluoro groups was about 20%. This varnish was diluted to 6% concentration, followed by addition of 0.3 wt% (as solid) of γ-aminopropyltriethoxysilane, and the preparation was subjected to printing work and heat treatment at 200° C. for 30 minutes to form an about 600 Å dense polyimide alignment layer, and a liquid crystal display device with a liquid crystal layer thickness d of 4.0 μm was made. When measured as in Example 1, b=1.3 μm; and b*=0.325.

For quantitative determination of display irregularity, the image at a 20 mm² area of the display section was taken by a CCD camera in a state of intermediate tone display where display irregularity appears most conspicuously, and contrast of maximum luminance irregularity was determined. It was about 0.8%. In the visual image quality test, no display irregularity attributable to the difference in liquid crystal layer thickness was noted and high-uniformity display was confirmed.

EXAMPLE 15

Following the procedure of Example 5, there were manufactured 7 liquid crystal panels having a liquid crystal layer thickness (gap) in the range of 5.0+0.6 μm to 5.0–1.0 μm in an encapsulated state of liquid crystal. Retardation (And) of these panels was 0.3–0.42 μm.

The alignment layer was made of an inorganic alignment layer material. On the thin-film transistor side of the substrate, an inorganic alignment control layer made of silicon oxide was formed by oblique evaporation technique over the outermost surface on an insulating protective layer made of silicon nitride. Oblique evaporation was carried out by using a louver designed to regulate the direction of evaporation to be 60° from the substrate normal to make the tilt angle of liquid crystal alignment substantially 0°.

On the other substrate was formed a color filter having a light shielding layer, with a polyimide alignment layer being formed on the outermost surface. The alignment layer surface was rubbed by a buffing cloth attached to the rubbing rollers to provide a liquid crystal alignment layer.

The polyimide alignment layer was formed by coating a solvent-soluble type polyimide precursor PIQ solution (available from Hitachi Chemical Co., Ltd.) on the substrate surface, printing it and then conducting heat treatment at 200° C. for 30 minutes. When measured as in Example 1, there was obtained b=1.6 μm.

Torsional anchoring of the rubbed polyimide alignment layer surface and the liquid crystal molecules is very strong, and as it is known from the separately conducted experiments that the extrapolation length at the interface is almost 0, it is considered that the best part of said extrapolation length is contribution of the inorganic alignment layer formed by oblique evaporation of silicon oxide. There was also obtained b* (calculated with center gap of 5.0 μm)= 0.32.

Determination of display performance of the above liquid crystal display device by a photoelectric photometer showed very small change of transmittance with difference in liquid crystal layer thickness as seen in the graph of FIG. 10 in which transmittance is plotted as ordinate and difference in liquid crystal layer thickness as abscissa with the center value of 5.0 μm as reference (0), either when a voltage Vmax which gives the maximum transmittance was applied or when a voltage V50 which gives 50% of the maximum transmittance was applied. For quantitative determination of display irregularity, the image at the display section was taken by a CCD camera in a state of intermediate tone display where display irregularity appears most conspicuously, and contrast of the maximum luminance irregularity (after elimination of gentle luminance shading stretching over the wide range of the whole display section not recognized as display irregularity) was determined. It was about 0.3%.

In the visual image quality test, there was noted no display irregularity due to the difference in liquid crystal layer thickness of the liquid crystal panels, and high-uniformity display was confirmed.

Also, there was observed no image retention nor sticking during operation, and the viewing angle characteristics were excellent.

EXAMPLE 16

The procedure of Example 14 was followed except that RN-718 (product by Nissan Chemical Co., Ltd.) was used in place of PIQ as the material of the polyimide alignment layer on the color filter side substrate surface in Example 15 to make a liquid crystal display device with a liquid crystal layer thickness d of 4.0 μm. There was obtained b=1.6 μm, in the same manner as in Example 1, which indicates that the extrapolation length b is substantially contribution of the inorganic alignment layer. There was obtained b*=0.4 (40%).

Contrast of the maximum luminance irregularity determined in the manner described above was about 0.2%. In the visual image quality test, there was seen no display irregularity attributable to the difference in liquid crystal layer thickness, nor were observed image retention and sticking, at testing to high-uniformity display by the present display device.

EXAMPLE 17

A liquid crystal display device with a liquid crystal layer thickness d of 4.0 μm was manufactured by following the procedure of Example 16 except that an insulating protective layer made of silicon nitride formed on the thin-film transistors and wiring electrodes was applied in place of the oblique evaporation deposited silicon oxide layer as the inorganic material layer on the outermost surface of the thin-film transistor side substrate in Example 15. When measured as in Example 1, b=2.8 μm; and b*=0.7 (70%).

The torsional anchoring coefficient A2 of the alignment layer surface of this Example, as determined from the value of twist elastic constant K2 against torsional deformation of the liquid crystal composition and the measured value of the extrapolation length b, was 1.8 μN/m.

Contrast of the maximum luminance irregularity was about 0.1%, and the visual image quality test showed no display irregularity due to the difference in liquid crystal layer thickness of the liquid crystal panels nor image retention and sticking, endorsing high-uniformity display by the present display device.

EXAMPLE 18

In the process of Example 5, an equimolar mixture of a compound of the formula (1) having diazobenzene groups:

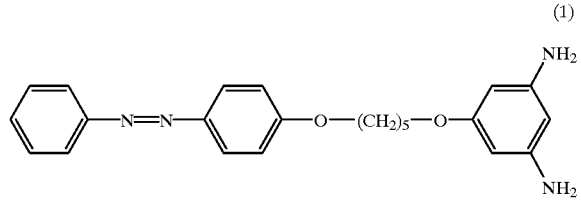

(1)

and 4,4'-diaminodiphenylmethane was used as the diamine compound, and a pyromellitic acid dianhydride and/or 1,2, 3,4-cyclobutanetetracarboxylic acid dianhydride was added and reacted to synthesize a polyamic acid varnish, and the latter was coated on the substrate surface, baked at 200° C. for 30 minutes for imidation, and then irradiated with linearly polarized light with a wave-length of 420 nm. Then the liquid crystal composition was encapsulated in the same manner as in Example 5, followed by annealing at 100° C. for 10 minutes to obtain liquid crystal alignment substantially orthogonal to the direction of linearly polarized light applied. In this way, a liquid crystal display device with a liquid crystal layer thickness d of 4.0 μm was obtained. When measured as in Example 1, b=1.0 μm; and b*=0.25.

The torsional anchoring coefficient A2 of the alignment layer surface of this Example, as determined from the value of elastic constant K2 against torsional deformation of the liquid crystal composition used and the measured value of the extrapolation length b, was 5.0 μN/m.

In order to make quantitative determination of display irregularity, the image at a 20 mm square area of the display section was taken by a CCD camera in a state of intermediate tone display where display irregularity appears most distinctly, and contrast of the maximum luminance irregularity was determined. It was about 0.5%. In the visual image quality test, there could be detected no display irregularity attributable to the difference in liquid crystal layer thickness of the liquid crystal panels, and high-uniformity display was obtained.

EXAMPLE 19

In the process of Example 18, a compound of the formula (2):

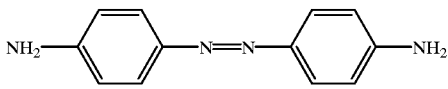

was used in place of the compound of the formula (1) as the diamine compound having diazobenzene groups, and a pyromellitic acid dianhydride and/or 1,2,3,4-cyclobutanetetracarboxylic acid dianhydride was added and reacted to synthesize a varnish, and the latter was coated on the substrate surface, baked at 200° C. for 30 minutes for imidation, and then exposed to polarized light with a wavelength of 420 nm.

The liquid crystal composition was encapsulated as in Example 5 and subjected to annealing at 100° C. for 10 minutes to obtain liquid crystal alignment substantially orthogonal to the linearly polarized light direction. In this way, a liquid crystal display device with a liquid crystal layer thickness d of 4.0 μm was produced. When measured as in Example 1, b=0.5 μm; and b*=0.125.

The torsional anchoring coefficient A2 of the alignment layer surface in the present Example, as determined from the value of elastic constant K2 against torsional deformation of the liquid crystal composition and the measured value of the extrapolation length b, was 10.2 μN/m.

For quantitative determination of display irregularity, the image at a 20 mm square area of the display section was taken by a CCD camera in a state of intermediate tone display where display irregularity appeared most conspicuously, and contrast of the maximum luminance irregularity was about 0.6%. In the visual image quality test, there was observed no display irregularity attributable to the difference in liquid crystal layer thickness of the liquid crystal panels, and high-uniformity display was obtained.

EXAMPLE 20

In the process of Example 18, a compound of the formula (3):

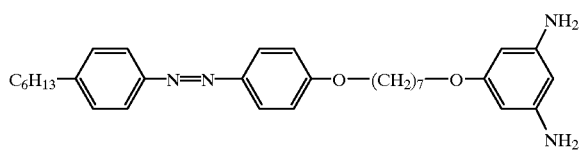

was used in place of the compound of the formula (1) as the diamine compound having diazobenzene groups, and a pyromellitic acid dianhydride and/or 1,2,3,4-cyclopentanetetracarboxylic acid dianhydride was added and reacted to synthesize a varnish and the latter was coated on the substrate surface, baked at 200° C. for 30 minutes for imidation and then exposed to linearly polarized light with a wavelength of 420 nm.

The liquid crystal composition was encapsulated as in Example 5 and then subjected to annealing at 100° C. for 10 minutes to obtain liquid crystal alignment in the direction substantially orthogonal to the applied linearly polarized light direction.

In this way, a liquid crystal display device with a liquid crystal layer thickness d of 4.0 μm was produced. When measured as in Example 1, b=1.5 μm; and b*=0.375.

The torsional anchoring coefficient A2 of the alignment layer surface of the instant Example, determined from the value of elastic constant K2 against torsional deformation of the liquid crystal composition and the measured value of the extrapolation length b, was 13.6 μN/m.

For quantitative determination of display irregularity, the image at a 20 mm square area of the display section was taken by a CCD camera in a state of intermediate tone display where display irregularity appears most conspicuously, and contrast of the maximum luminance irregularity was determined. It was about 0.3%. In the visual image quality test, there was observed no display irregularity due to the difference in liquid crystal layer thickness of the liquid crystal panels, and high-uniformity display was obtained.

EXAMPLE 21

By using a nematic liquid crystal composition having a negative dielectric anisotropy Δε of 4.8 (1 kHz, 20° C.), a refractive index anisotropy Δn of 0.054 (590 nm, 20° C.) and a twist elastic constant K2 of 7.9 pN and by following the procedure of Example 12 except for the rubbing direction, a liquid crystal display device with a liquid crystal layer thickness d of 4.0 μm was produced. In correspondence to the negative dielectric anisotropy of the liquid crystal composition, the angle made by the rubbing direction of the two substrates arranged substantially parallel to each other and the applied transverse field direction was set to be 15°. When measured as in Example 1, b=0.4 μm; and b*=0.1.

The torsional anchoring coefficient A2 of the alignment layer surface of this Example, as determined from the value of elastic constant K2 against torsional deformation of the liquid crystal composition and the measured value of the extrapolation length b, was 19.8 μN/m.

For quantitative determination of display irregularity, the image at a 20 mm square area of the display section was taken by a CCD camera in a state of intermediate tone display where display irregularity appears most conspicuously, and contrast of the maximum luminance irregularity was determined. It was about 2%. In the visual image quality test, there was observed no display irregularity attributable to the difference in liquid crystal layer thickness of the liquid crystal panels, and high-uniformity display was obtained.

Comparative Example 1

8 sheets of liquid crystal display device having a liquid crystal layer thickness d in the range of 4.6+0.3 to 4.6−1.0 μm were produced by following the procedure of Example 1 except that a polyimide alignment layer material RN-718 (a product by Nissan Chemical Co., Ltd.) was used in place of RN-1046 as the alignment layer material.

The extrapolation length b measured with this liquid crystal display device by Fredericksz transition method as in Example 1 was substantially 0 μm. The extrapolation length/gap ratio b* was also substantially 0.

Evaluation of this liquid crystal display device in the same way as in Example 1 gave the following results.

Figure 11:
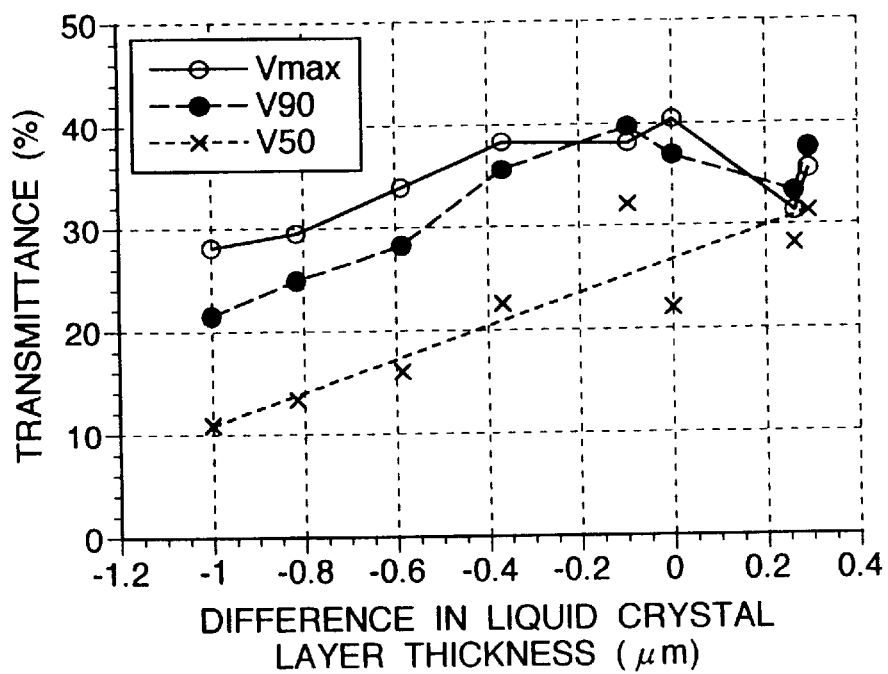
FIG. 11 is a graph showing the results of determinations in a comparative example of the present invention.

First, the relation between liquid crystal layer thickness and transmittance of the above liquid crystal display device was determined to obtain the result shown in FIG. 11.

The characteristic diagram of FIG. 11, as that of Example 1 shown in FIG. 7, shows the characteristic curves observed in the three different cases: when a voltage Vmax which gives the maximum transmittance was applied; when a voltage V90 which gives 90% of the maximum transmittance was applied; and when a voltage V50 which gives 50% of the maximum transmittance was applied, with the center value of the liquid crystal layer thickness d being given as reference value (0) in each case.

As is seen from this graph, in Comparative Example 1, the amount of change of transmittance due to the difference in liquid crystal layer thickness reaches as much as 12%, and its comparison with the graph of FIG. 7 representing an embodiment of the present invention evidently shows the difference in quality between the two devices.

Then, in the similar manner as in Example 1, the image at the display section of this liquid crystal display device was taken by a CCD camera, and contrast of the maximum luminance irregularity was determined. It was found that the luminance irregularity factor reached as high as 15%, and color shading of display due to variation of difference in liquid crystal layer thickness was conspicuous visually.

Comparative Example 2

A liquid crystal display device with a liquid crystal layer thickness d of 4.0 μm was produced by following the procedure of Example 1 except for use of PIQ (a polyimide alignment layer material produced by Hitachi Chemical Co., Ltd.) in place of RN-1046 as the polyimide alignment layer material. When measured as in Example 1, b≈0 μm; and b*≈0.

Evaluation of this liquid crystal display device in the same way as in Example 1 showed conspicuous color shading of display due to variation of difference in liquid crystal layer thickness in the visual test.

Comparative Example 3

A liquid crystal display device was produced by following the procedure of Example 5 except for use of an alignment layer material having a polystyrene-reduced weight-average molecular weight of about 120,000 obtained by polymerizing 0.4 mol% (40% of the total number of moles) of 2,4-diamino-palmitylphenyl ether, 0.6 mol% of 2,2,4-bis[4-(p-aminophenoxy)phenyl]propane, 0.5 mol% of 1,2,3,4-cyclobutanetetracarboxylic acid dianhydride and 0.5 mol% of 3,3',4,4'-biphenyltetracarboxylic acid dianhydride in N-methyl-2-pyrrolidone at 20° C. for 10 hours.

There were also produced 7 liquid crystal panels having a liquid crystal layer thickness d in the range of 4.3+0.55 to 4.3−0.9 μm. When measured as in Example 1, b≈0 μm, and hence b*≈0.

Figure 12:
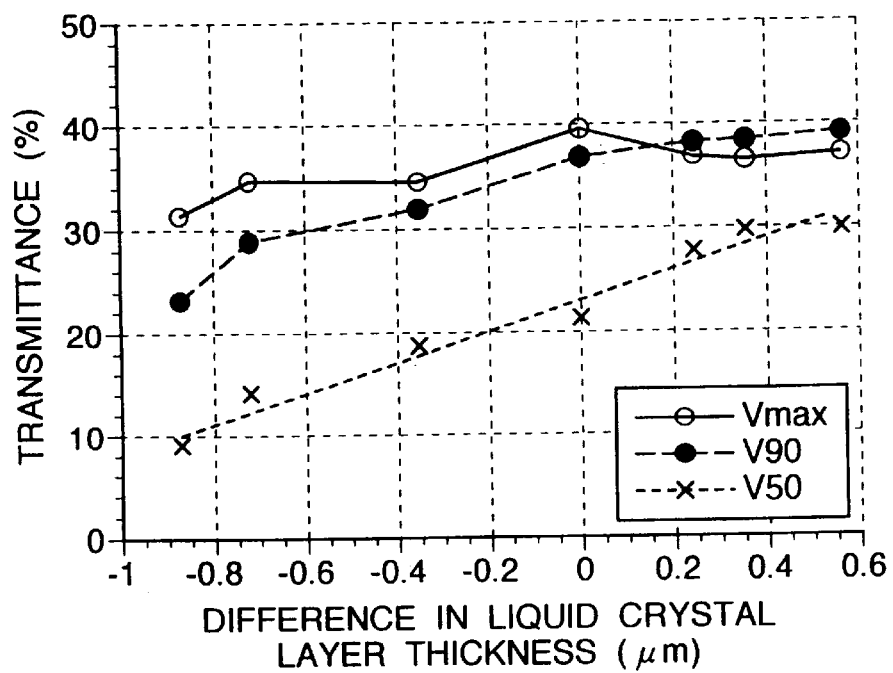
FIG. 12 is a graph showing the results of determinations in another comparative example of the present invention.

The same evaluation as made in Example 1 showed a large variation of transmittance due to the difference in liquid crystal layer thickness as shown in FIG. 12 corresponding to FIG. 7 of Example 1. Contrast of the maximum luminance irregularity was 12%. Color shading of display due to variation of difference in liquid crystal layer thickness was conspicuous visually.

Comparative Example 4

A liquid crystal display device with a liquid crystal layer thickness d of 4.0 μm was produced according to the procedure of Example 5 except for use of an alignment layer material having a polystyrene-reduced weight-average molecular weight of about 100,000 obtained by polymerizing 0.8 mol% (80% of the total number of moles) of 2,2-bis[4- (p-aminophenoxy)-phenyl]decane, 0.2 mol% of 4,4'-diaminodiphenylmethane, 0.5 mol% of pyromellitic acid dianhydride and 0.5 mol% of 1,2,3,4-cyclopentanetetracarboxylic acid dianhydride in N-methyl-2-pyrrolidone at 20° C. for 12 hours. When measured as in Example 1, b=3.2 μm; and b*=0.8.

The tilt angle at the substrate interface measured by the crystal rotation method was 15°.

As a result of the evaluation same as in Example 1, contrast of the maximum luminance irregularity was about 18%, color shading of display was conspicuous in the visual test, and an approximately 30% variation of tilt angle was seen at and around the shading.

Comparative Example 5

A liquid crystal display device with a liquid crystal layer thickness d of 4.0 μm was produced by carrying out the procedure of Example 5 except for use of an alignment layer material having a polystyrene-reduced weight-average molecular weight of about 110,000, obtained by polymerizing 0.5 mol% (50% of the total number of moles) of 2,4-diamino-palmitylphenyl ether, 0.5 mol% of 2,2-bis[4-(p-aminophenoxy)phenyl]-propane, 0.5 mol% of 3,4-cyclobutanetetracarboxylic acid dianhydride and 0.5 mol% of 3,3',4,4'-biphenyltetracarboxylic acid dianhydride in N-methyl-2-pyrrolidone at 20° C. for 12 hours. When measured as in Example 1, b=3.0 μm; and b*=0.75.

The tilt angle at the substrate interface measured by the crystal rotation method was 12°.

As a result of the evaluation same as in Example 1, color shading of display was salient in the visual test, contrast of the maximum luminance irregularity was about 15%, and an approximately 20% variation of tilt angle was seen at and around the shading.

Comparative Example 6

A liquid crystal display device was produced by following the procedure of Example 5 except for use of an alignment layer material having a polystyrene-reduced weight-average molecular weight of about 120,000, in which the ratio of the oligomer containing fluoro groups was about 3%, obtained by polymerizing 0.03 mol% of 2,2-bis[4-(p-aminophenoxy)phenyl]hexafluoropropane, 0.97 mol% of 4,4'-diaminodiphenyl ether, 0.5 mol% of 1,2,3,4-cyclobutanetetracarboxylic acid dianhydride and 0.5 mol% of 3,3',4,4'-biphenyltetracarboxylic acid dianhydride in N-methyl-2-pyrrolidone at 20° C. for 8 hours.

There were also produced 6 liquid crystal panels having a liquid crystal layer thickness d in the range of 4.6+0.9 to 4.6−0.5 μm. When measured as in Example 1, b≈0.1 μm; and b*=0.02.

The torsional anchoring coefficient A2 at the alignment layer surface of the instant Example, as determined from the value of elastic constant K2 against torsional deformation of the liquid crystal composition and the measured value of the extrapolation length b, was 50 μN/m.

Figure 13:
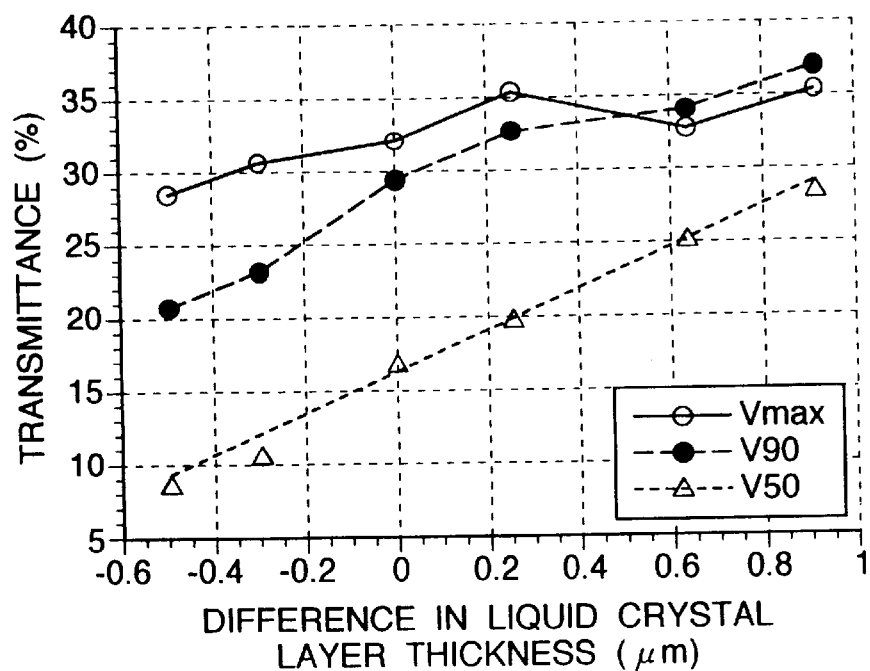
FIG. 13 is a graph showing the results of determinations in still another comparative example of the present invention.

The result of the evaluation same as in Example 1 showed a large variation of transmittance due to the difference in liquid crystal layer thickness as shown in FIG. 13 corresponding to FIG. 7 of Example 1. Contrast of the maximum luminance irregularity was 20%, and color shading due to the variation of difference in liquid crystal layer thickness was salient visually.

Comparative Example 7

A liquid crystal display device having a liquid crystal layer thickness d of 4.2 μm was produced according to the procedure of Example 5 except for use of an alignment layer material having a polystyrene-reduced weight-average molecular weight of about 100,000, in which the ratio of the oligomer containing fluoro groups was about 50%, obtained by polymerizing 0.5 mol% of 2,2-bis[4-(p-aminophenoxy) phenyl]propane, 0.5 mol% of 4,4'-diaminodiphenylmethane and 0.5 mol% of 2,2-bis[4-(3,4-dicarboxybenzoyloxy)-3,5-dimethylphenyl]hexafluoropropanetetracarboxylic acid dianhydride in N-methyl-2-pyrrolidone at 20° C. for 8 hours. When measured as in Example 1, b≈0.2 μm; and b*=0.048.

As a result of the evaluation same as in Example 1, contrast of the maximum luminance irregularity was 12%, and color shading of display due to variation of difference in liquid crystal layer thickness was salient visually. Luminance irregularity due to improper alignment was also conspicuous.

Comparative Example 8

A liquid crystal display device with a liquid crystal layer thickness d of 4.5 μm was produced in the same way as in Example 5 except for use of an alignment layer material having a polystyrene-reduced weight-average molecular weight of about 1,000, in which the proportion of the oligomer having fluoro groups was about 2%, obtained by polymerizing 0.02 mol% of 2,2-bis[4-(p-aminophenoxy) phenyl]hexafluoropropane, 0.98 mol% of 4,4'-diaminodiphenyl ether, 0.5 mol% of 1,2,3,4-cyclobutanetetracarboxylic acid dianhydride and 0.5 mol% of 3,3',4,4'-biphenyltetracarboxylic acid dianhydride in N-methyl-2-pyrrolidone at 20° C. for 8 hours. When measured as in Example 1, b≈0.1 μm; and b*=0.022.

The torsional anchoring coefficient A2 at the alignment layer surface of the instant embodiment, as determined from the elastic constant K2 against torsional deformation of the liquid crystal composition and the measured value of the extrapolation length b, was 25 μN/m.

As a result of the evaluation same as in Example 1, contrast of the maximum luminance irregularity was 13% and color shading of display due to the variation of difference in liquid crystal layer thickness was conspicuous visually.

Comparative Example 9

A liquid crystal display device was produced according to Example 15 except that a rubbed polyimide alignment layer material RN-718 (produced by Nissan Chemical Co., Ltd.) was used for both of the pairing substrates, instead of using a rubbed polyimide alignment layer material PIQ (produced by Hitachi Chemical Co., Ltd.) for one of the pairing substrates and an oblique-evaporated silicon oxide alignment layer material for the other substrate. There were also produced 6 liquid crystal panels having a liquid crystal layer thickness d in the range of 4.24+0.6 to 4.24−0.8 μm. When measured as in Example 1, b≈0 μm, and hence b*≈0 (0%).

Figure 14:
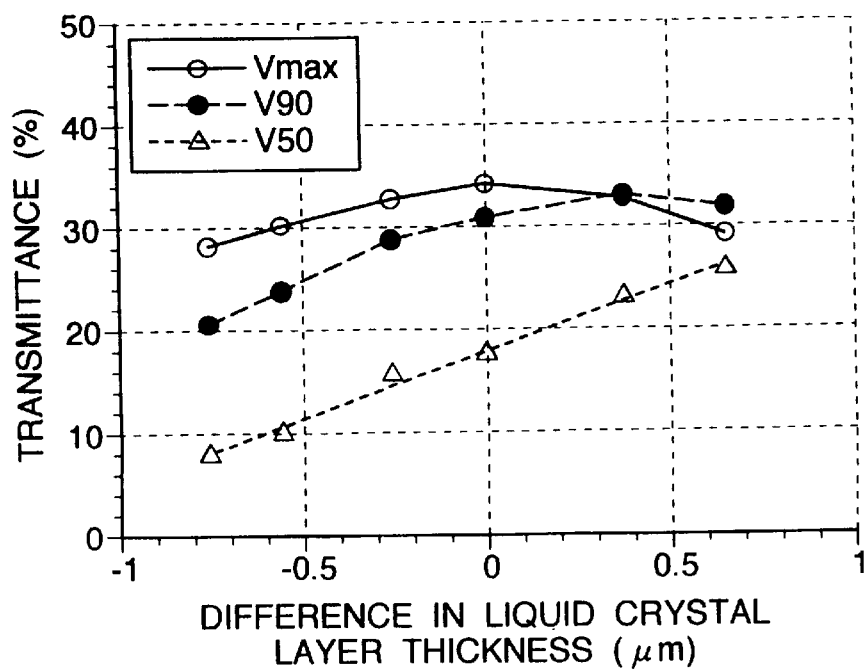
FIG. 14 is a graph showing the results of determinations in yet another comparative example of the present invention.

The result of the evaluation same as in Example 1 showed a large variation of transmittance due to the difference in liquid crystal layer thickness as shown in FIG. 14 corresponding to FIG. 7 of Example 1. Contrast of the maximum luminance irregularity was 12%, and color shading of display due to the variation of difference in liquid crystal layer thickness was salient visually.

Some of the produced liquid crystal panels had a notable number of pixels which failed to go on probably due to dielectric breakdown. Also, their viewing angle characteristics were obviously worse than those of the panels of Example 1.

Comparative Example 10

A liquid crystal display device was produced according to claim 15 except that PIQ was used as the alignment layer material for both of the pairing substrates, instead of forming a rubbed polyimide alignment layer with PIQ for one of the pairing substrates and an oblique-evaporated silicon oxide alignment layer for the other substrate, and that rubbing was performed only on the polyimide alignment layer surface of the substrate on the color filter formed side, with no rubbing conducted on the polyimide alignment layer of the substrate on the thin-film transistor formed side.

In this liquid crystal display device, alignment irregularity took place around the filling hole when the liquid crystal composition was injected into the liquid crystal cell in a state of nematic phase, and this irregularity was scarcely reduced even when the liquid crystal cell was once heated to the isotropic phase and then gradually cooled down to return to the nematic phase.

In the evaluation same as in Example 1, contrast of the maximum luminance irregularity was about 30% and color shading of display was salient in the visual test.

Comparative Example 11

In Example 1, a polyimide alignment layer material RN-1046 was applied on the substrate and heated, and without rubbing, the layer surface was subjected to polarized light irradiation by excimer laser with a wavelength of 248 nm to impart a liquid crystal alignability to the layer. When measured as in Example 1, b≈0 μm; and b*≈0.

In the same evaluation as in Example 1, contrast of the maximum luminance irregularity was about 20% and color shading of display was conspicuous in the visual test.

The liquid crystal alignability in this example is considered attributable to selective polyimide decomposition caused by polarized laser light irradiation, and image retention which appears to have been caused by the decomposed ionic radicals was conspicuous.

As explained above in detail, it is possible with the present invention to obtain an active-matrix liquid crystal display device capable of high-quality image display and minimized in display irregularity due to variation of the gap between the substrates in the in-plane switching mode where an electric field substantially parallel to the substrate surface is applied to the liquid crystal molecules.

Further, a greater degree of freedom is allowed for setting of the gap between the substrates and other works in the production process, and an active-matrix liquid crystal display device with high mass productivity can be obtained.

What is claimed is:

1. An active-matrix liquid crystal display device comprising:
    a pair of substrates at least one of which is transparent;
    a liquid crystal layer disposed between said pair of substrates;
    a group of electrodes for applying to said liquid crystal layer an electric field substantially parallel to the substrate plane and a plural number of active elements being formed on one of said pair of substrates; and
    an alignment layer disposed between said liquid crystal layer and at least one of said pair of substrates, wherein said alignment layer is a photo-reactive material layer, and said photo-reactive material layer is a photo-reactive alignment layer which has been subjected to linearly polarized light irradiation to selectively derive a photochemical reaction;

wherein said alignment layer is made of an organic polymer having at least one of long-chain alkylene groups and fluoro groups selected from the group consisting of at least one of a polymer and an oligomer-amic acid imide, at least one of a polymer and an oligomer-imide, at least one of a polymer and an oligomer-imidosiloxane, and at least one of a polymer and an oligomer-amide-imide; and wherein at least one of said alignment layers is made of an organic polymer containing at least one of the polymer and oligomer in which the polymerizate of at least one of the long-chain alkylene groups and fluoro groups incorporated in the amine moiety or acid moiety is 5–30% of the total number of moles.

2. An active-matrix liquid crystal display device according to claim 1, wherein the weight-average molecular weight of one of said polymer and oligomer is 2,000 to 90,000.

3. An active-matrix liquid crystal display device according to claim 1, wherein one of said polymer and oligomer contain at least one of the long-chain alkylene group and fluoro group in a main chain, side chains or terminal moiety.

4. An active-matrix liquid crystal display device according to claim 1, wherein said alignment layer is made of an organic polymer prepared by dehydration ring-closure of at least one of a polymer and an oligomer-amic acid comprising a single-ring rigid diamine as amine moiety and an aliphatic tetracarboxylic acid dianhydride or an alicyclic tetracarboxylic acid dianhydride as acid moiety.

5. An active-matrix liquid crystal display device comprising:

a pair of substrates at least one of which is transparent;

a liquid crystal layer disposed between said pair of substrates;

a group of electrodes for applying to said liquid crystal layer an electric field substantially parallel to the substrate plane and a plural number of active elements connected to said electrodes, said group of electrodes and active elements being formed on one of said pair of substrates; and an alignment layer disposed between said liquid crystal layer and at least one of said pair of substrate, wherein said alignment layer is made of an organic polymer having at least one of long-chain alkylene groups and fluoro groups selected from the group consisting of at least one of a polymer and an oligomer-amic acid imide, at least one of a polymer and an oligomer-imide, at least one of a polymer and an oligomer-imidosiloxane and at least one of a polymer and an oligomer-amide-imide;

wherein at least one of said alignment layers is made of an organic polymer containing at least one of the polymer and oligomer in which the polymerizate of at least one of the long-chain alkylene groups and fluoro groups incorporated in the amine moiety or acid moiety is 5–30% of the total number of moles.

6. An active-matrix liquid crystal display device according to claim 5, wherein the weight-average molecular weight of one of said polymer and oligomer is 2,000 to 90,000.

7. An active-matrix liquid crystal display device according to claim 5, wherein one of said polymer and oligomer contain at least one of the long-chain alkylene group and fluoro group in a main chain, side chains or terminal moiety.

8. An active-matrix liquid crystal display device according to claim 5, wherein said alignment layer is made of an organic polymer prepared by dehydration ring-closure of at least one of polymer and an oligomer-amic acid comprising a single-ring rigid diamine as amine moiety and an aliphatic tetracarboxylic acid dianhydride or an alicyclic tetracarboxylic acid dianhydride as acid moiety.

* * * * *